United States Patent
Hassler

(10) Patent No.: US 12,231,722 B2
(45) Date of Patent: *Feb. 18, 2025

(54) METHODS AND SYSTEMS FOR CONTENT DELIVERY

(71) Applicant: Comcast Cable Communications, LLC, Philadelphia, PA (US)

(72) Inventor: Garey Hassler, Castle Pines, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 3 days.

This patent is subject to a terminal disclaimer.

(21) Appl. No.: 18/302,419

(22) Filed: Apr. 18, 2023

(65) Prior Publication Data
US 2023/0362435 A1    Nov. 9, 2023

Related U.S. Application Data

(63) Continuation of application No. 16/521,264, filed on Jul. 24, 2019, now Pat. No. 11,671,653.

(60) Provisional application No. 62/818,452, filed on Mar. 14, 2019.

(51) Int. Cl.
| | | |
|---|---|---|
| H04N 21/437 | (2011.01) | |
| H04N 21/44 | (2011.01) | |
| H04N 21/442 | (2011.01) | |
| H04N 21/83 | (2011.01) | |

(52) U.S. Cl.
CPC ..... *H04N 21/44008* (2013.01); *H04N 21/437* (2013.01); *H04N 21/442* (2013.01); *H04N 21/83* (2013.01)

(58) Field of Classification Search
CPC ........... H04N 21/44008; H04N 21/437; H04N 21/442; H04N 21/83
USPC .................................................. 725/138, 139
See application file for complete search history.

(56) References Cited

U.S. PATENT DOCUMENTS

| | | |
|---|---|---|
| 6,195,680 B1 | 2/2001 | Goldszmidt et al. |
| 6,377,996 B1 | 4/2002 | Lumelsky et al. |
| 6,772,216 B1 | 8/2004 | Ankireddipally et al. |
| 6,976,085 B1 | 12/2005 | Aviani et al. |
| 7,254,634 B1 | 8/2007 | Davis et al. |
| 7,587,467 B2 | 9/2009 | Hesselink et al. |
| 8,082,591 B2 | 12/2011 | Gu et al. |
| 8,214,862 B1 | 7/2012 | Lee et al. |
| 8,379,668 B2 | 2/2013 | Poder et al. |
| 9,104,882 B2 | 8/2015 | Salinger et al. |
| 9,106,663 B2 | 8/2015 | Patterson et al. |

(Continued)

OTHER PUBLICATIONS

U.S. Appl. No. 17/501,980 (2022/0103641), filed Oct. 14, 2021 (Mar. 31, 2022), Garey Hassler (Comcast Cable Communications.

(Continued)

*Primary Examiner* — Nathan J Flynn
*Assistant Examiner* — Caroline Somera
(74) *Attorney, Agent, or Firm* — Ballard Spahr LLP

(57) ABSTRACT

Methods and systems for delivering content are described. A content distribution network may utilize multiple content sources and datacenters when delivering content to a requesting device. One or more service metrics associated with the content as it is being prepared for delivery at each of the datacenters may be monitored by a quality agent. The quality agent may use the one or more service metrics to select a distribution datacenter to deliver the content to the requesting device. The quality agent may instruct the remaining datacenters to disable delivery of the content to the requesting device.

40 Claims, 12 Drawing Sheets

(56) References Cited

U.S. PATENT DOCUMENTS

| | | |
|---|---|---|
| 9,608,957 B2 | 3/2017 | Sivasubramanian et al. |
| 10,560,215 B1 | 2/2020 | Hegar et al. |
| 10,630,990 B1 | 4/2020 | Saxton et al. |
| 11,057,446 B2 | 7/2021 | Shribman et al. |
| 2004/0059939 A1 | 3/2004 | de Jong |
| 2007/0245010 A1 | 10/2007 | Arn et al. |
| 2008/0222277 A1 | 9/2008 | Park et al. |
| 2009/0287835 A1 | 11/2009 | Jacobson |
| 2010/0157882 A1 | 6/2010 | Moriwaki et al. |
| 2011/0082924 A1 | 4/2011 | Gopalakrishnan |
| 2011/0167105 A1 | 7/2011 | Ramakrishnan et al. |
| 2012/0054265 A1 | 3/2012 | Kazerani et al. |
| 2012/0110199 A1 | 5/2012 | Mao et al. |
| 2013/0007223 A1 | 1/2013 | Luby et al. |
| 2013/0166659 A1 | 6/2013 | Champel et al. |
| 2013/0238799 A1 | 9/2013 | Osamura et al. |
| 2013/0244614 A1 | 9/2013 | Santamaria et al. |
| 2013/0297738 A1 | 11/2013 | Tarkoma |
| 2013/0304851 A1 | 11/2013 | Vance |
| 2014/0348165 A1 | 11/2014 | Frydman et al. |
| 2015/0012661 A1 | 1/2015 | Elmore |
| 2015/0032856 A1 | 1/2015 | Ishikawa et al. |
| 2015/0067819 A1 | 3/2015 | Shribman et al. |
| 2015/0100631 A1 | 4/2015 | Jenkins et al. |
| 2015/0134967 A1 | 5/2015 | Moore |
| 2015/0172389 A1 | 6/2015 | Michimura et al. |
| 2015/0222670 A1 | 8/2015 | Inoue et al. |
| 2016/0036804 A1 | 2/2016 | Moore |
| 2016/0055188 A1 | 2/2016 | Goel et al. |
| 2016/0057139 A1 | 2/2016 | McDonough et al. |
| 2016/0080252 A1 | 3/2016 | Ramachandran et al. |
| 2016/0119431 A1 | 4/2016 | Bortz et al. |
| 2016/0241910 A1 | 8/2016 | Rowe |
| 2016/0337426 A1 | 11/2016 | Shribman et al. |
| 2016/0380852 A1 | 12/2016 | Kawamori et al. |
| 2017/0011084 A1 | 1/2017 | Goel et al. |
| 2017/0055007 A1 | 2/2017 | Phillips et al. |
| 2017/0078432 A1 | 3/2017 | Miller et al. |
| 2017/0163738 A1 | 6/2017 | Tamura |
| 2017/0163755 A1 | 6/2017 | Slocombe et al. |
| 2018/0139192 A1 | 5/2018 | Pishinov et al. |
| 2018/0227606 A1 | 8/2018 | Fryer et al. |
| 2019/0215361 A1 | 7/2019 | Lohmar et al. |
| 2019/0222619 A1 | 7/2019 | Shribman et al. |
| 2020/0213592 A1 | 7/2020 | Saxton et al. |
| 2020/0351378 A1 | 11/2020 | Shribman et al. |
| 2021/0127151 A1 | 4/2021 | Sengupta et al. |
| 2021/0258158 A1 | 8/2021 | Nelson et al. |

OTHER PUBLICATIONS

U.S. Appl. No. 16/521,264 (U.S. Pat. No. 11,671,653), filed Jul. 24, 2019 (Jun. 6, 2023), Garey Hassler (Comcast Cable Communications, LLC).

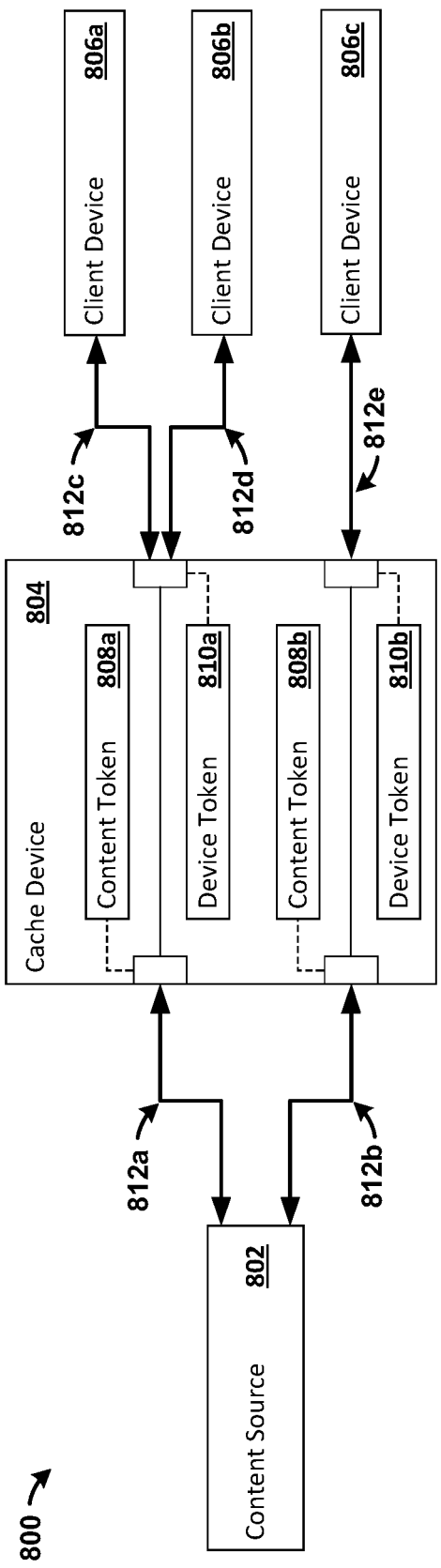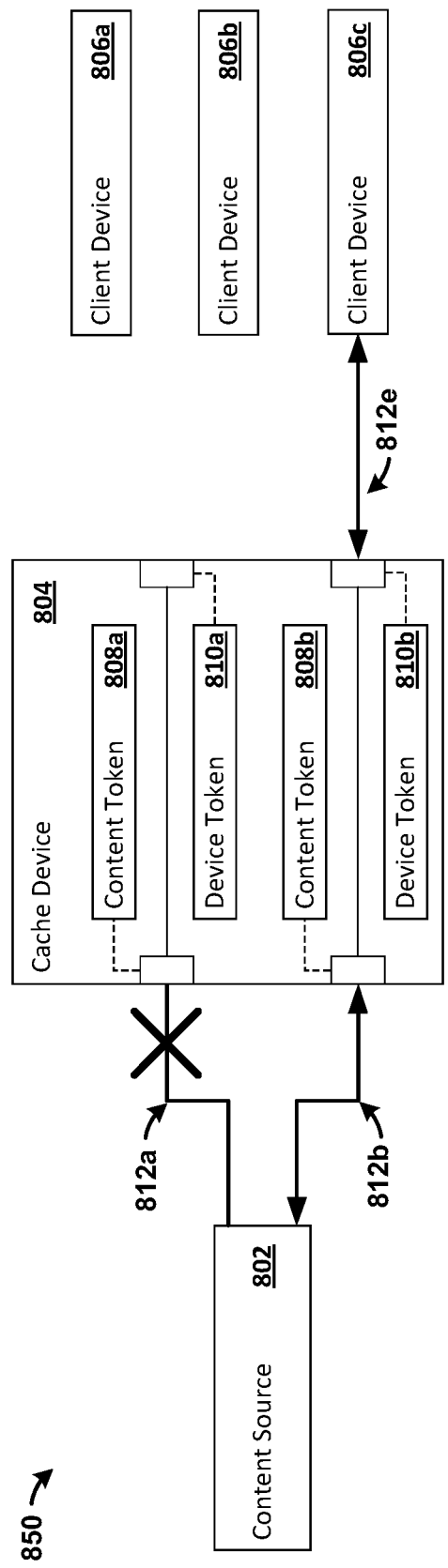

METHODS AND SYSTEMS FOR CONTENT DELIVERY

CROSS REFERENCE TO RELATED PATENT APPLICATION

This application is a continuation of U.S. application Ser. No. 16/521,264, filed Jul. 24, 2019, which claims priority to U.S. Application No. 62/818,452, filed on Mar. 14, 2019, which are herein incorporated by reference in their entirety.

BACKGROUND

In content distribution networks, latency in preparing a given content item for delivery may cause errors, failed content delivery attempts, and a poor content consumption experience. Content distribution networks may employ a process in which requests for a given content item are received by intermediate devices that forward the requests to a series of other devices that obtain the given content item. Computational times required for these devices to determine if they are equipped to process a request for the given content item, or to implement redundancy processes when they cannot process the request, contribute to latency in a content distribution network and increase the overall content delivery time. These and other considerations are addressed by the present description.

SUMMARY

It is to be understood that both the following general description and the following detailed description are exemplary and explanatory only and are not restrictive. Methods and systems for content delivery are described. In order to provide optimal quality, a content distribution network may utilize multiple content sources and multiple datacenters when delivering a given content item to a requesting device. The given content item may be delivered to the requesting device via a first content source, irrespective of the requesting device having requested the content item to be delivered via a second content source. One or more service metrics associated with the given content item as it is being prepared for delivery at each of the datacenters may be monitored by a quality agent. The quality agent may use the one or more service metrics to select a distribution datacenter to deliver the given content item to the requesting device, and the quality agent may instruct the remaining datacenters to disable delivery of the given content item to the requesting device. This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of the present description serve to explain the principles of the methods and systems described herein:

FIGS. 8A and 8B show a system for delivering content.

DETAILED DESCRIPTION

Figure 1:
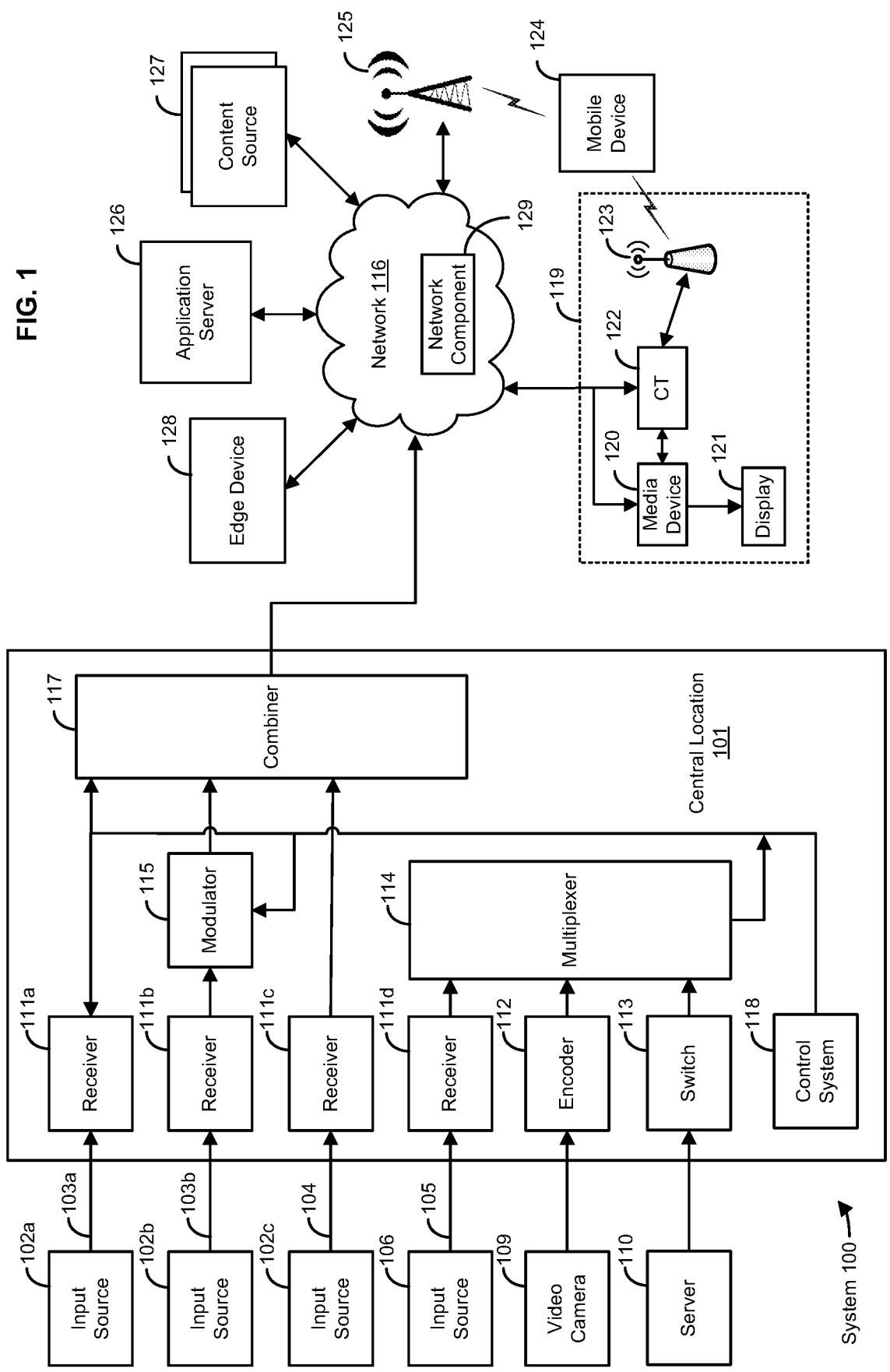
FIG. 1 shows a system for delivering content.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as business or group). Content may be electronic representations of video, audio, text and/or graphics, which may be but is not limited to electronic representations of videos, movies, or other multimedia, which may be but is not limited to data files adhering to MPEG2, MPEG, MPEG4 UHD, HDR, 4k, 8k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats.

"Consuming content" or the "consumption of content," as those phrases are used herein, may also be referred to as "accessing" content, "providing" content, "sending" content, "viewing" content, "listening" to content, "rendering" content, or "playing" content, among other things. In some cases, the particular term utilized may be dependent on the context in which it is used. Consuming video may also be referred to as viewing or playing the video. Consuming audio may also be referred to as listening to or playing the audio.

This detailed description may refer to a given entity performing some action. It should be understood that this language may in some cases mean that a system (e.g., a computer) owned and/or controlled by the given entity is actually performing the action.

A content distribution network may use a plurality of video quality agents to optimize delivery of requested content from one or more content sources. The plurality of video quality agents may each be resident in separate datacenters of the content distribution network. Each distribution datacenter may receive requested content from a unique content source. The plurality of video quality agents may share information relating to one or more service metrics associated with preparation of the requested content for delivery at each distribution datacenter. In this way, the plurality of video quality agents may operate in unison and ensure that requested content is received, packaged, and delivered by the distribution datacenter having a highest service metric associated with the requested content. The plurality of video quality agents may facilitate delivery of the requested content from an alternate content source when delivery of the requested content from a first content source would result in sub-optimal delivery quality. The present description thus provides an improvement to computing technology in at least that the present description provides intelligent delivery processes that improve the overall architecture and robustness of the content distribution network.

FIG. 1 shows a system 100 for content delivery. Those skilled in the art will appreciate that digital equipment and/or analog equipment may be employed. One skilled in the art will appreciate that provided herein is a functional description and that the respective functions may be performed by software, hardware, or a combination of software and hardware. The system 100 may have a central location 101 (e.g., a headend), which may receive content (e.g., data, input programming, and the like) from multiple sources. The central location 101 may combine the content from the various sources and may distribute the content to user (e.g., subscriber) locations (e.g., a user location 119) via a network 116 (e.g., content distribution and/or access system).

Figure 2:
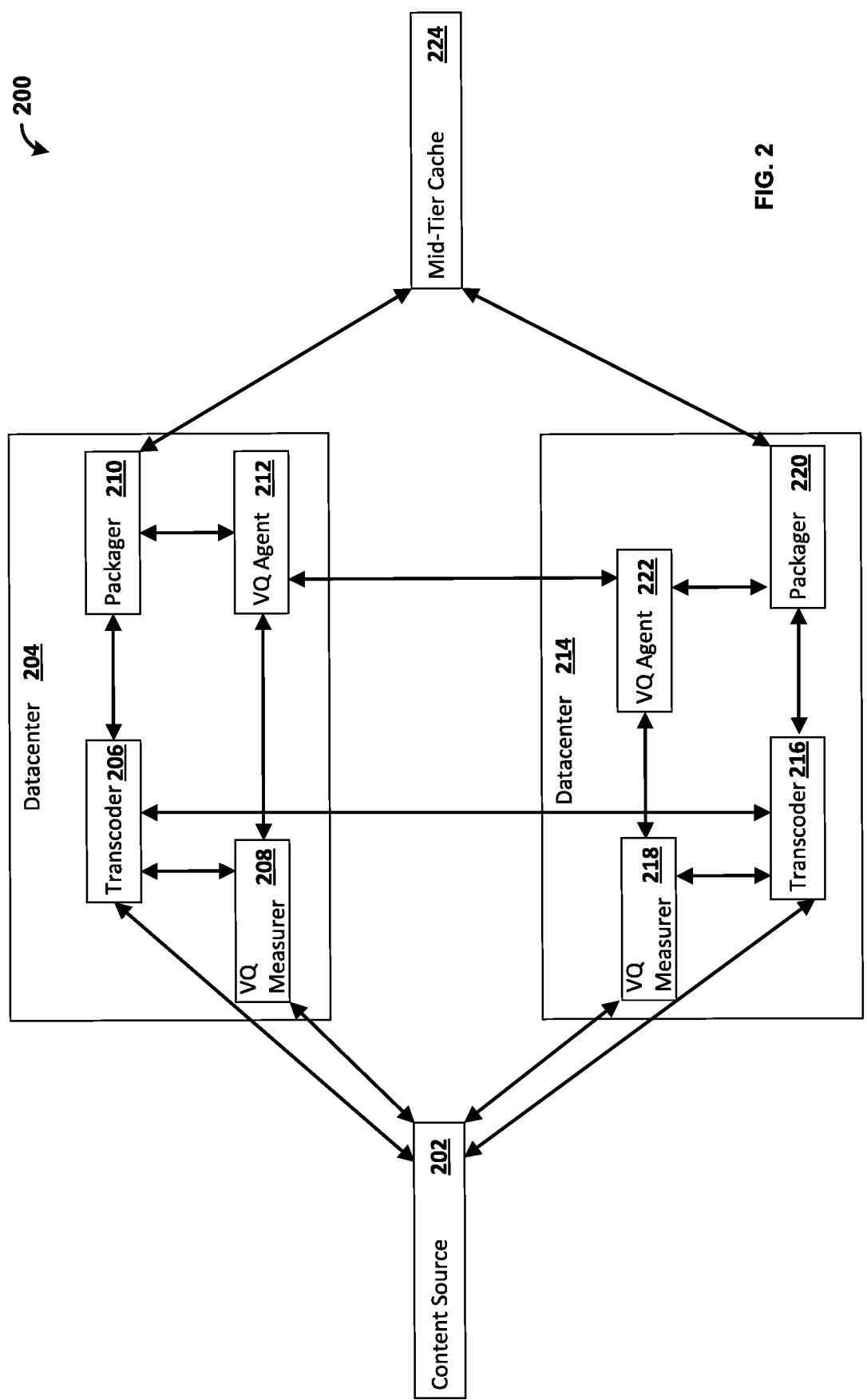
FIG. 2 shows a system for delivering content.

The central location 101 may receive content from a variety of sources 102a, 102b, and 102c. Each of the sources 102a, 102b, and 102c may be a datacenter having one or more packaging devices, transcoding devices, and content quality devices (e.g., as shown in FIG. 2 and discussed below). The content may be sent from any of the sources 102a, 102b, or 102c to the central location 101 via a variety of transmission paths, including wireless paths (e.g., satellite paths 103a, 103b) and terrestrial paths 104. The central location 101 may also receive content from a direct feed source 106 via a direct line 105 (e.g., one or more communication links and/or one or more communication paths). Other input sources may be capture devices such as a video camera 109 or a server 110. The content sent by the content sources may comprise a single content item, a portion of a content item (e.g., content fragment), a content stream, a multiplex that includes several content items, and/or the like. The content item may be an advertisement.

The central location 101 may have one or a plurality of receivers 111a, 111b, 111c, 111d that are associated with one or more corresponding input sources. The central location 101 may comprise one or more encoders 112, switches 113, multiplexers, and/or the like. An encoder 112 may compress, encrypt, transform, and/or otherwise encode content. The encoder 112 may encode content based on one or more compression standards, such as MPEG. The encoder may receive content from the video camera 109 and/or other source and apply one or more encoding algorithms to the received content. A switch 113 may provide access to server 110, which may be a Pay-Per-View server, a data server, an internet router, a network system, a phone system, and the like. Some signals may require additional processing, such as signal multiplexing, prior to being modulated. Such multiplexing may be performed by a multiplexer 114.

The central location 101 may comprise one or more modulators 115 for interfacing with a network 116. A modulator may receive content from a receiver 111, encoder 112, multiplexer 114, and/or the like. A modulator 115 may convert the received content into a modulated output signal suitable for transmission over the network 116. A modulator 115 may map portions of the content to data bits expressed as signals (e.g., sinusoidal signals) at corresponding subcarrier frequencies of a data symbol. The output signals from the modulator 115 may be combined (e.g., packaged), using equipment such as a combiner 117 (e.g., a packaging device), for input into the network 116.

The network 116 may be a content distribution network, a content access network, and/or the like. The network 116 may be configured to send content from a variety of sources using a variety of network paths, protocols, devices, and/or the like. The content distribution network and/or content access network may be managed (e.g., deployed, serviced) by a content provider, a service provider, and/or the like. The network 116 may have a plurality of communication links connecting a plurality of devices.

A control system 118 may permit a system operator to control and monitor the functions and performance of system 100. The control system 118 may interface, monitor, and/or control a variety of functions, including, but not limited to, the channel lineup for a television system, billing for each user, conditional access for content distributed to users, and the like. The control system 118 may provide input to the modulators 115 for setting operating parameters, such as system specific MPEG table packet organization or conditional access information. The control system 118 may be located at the central location 101 or at a remote location.

The network 116 may distribute signals from the central location 101 to user locations, such as a user location 119. The network 116 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof.

A multitude of users may be connected to the network 116. At the user location 119, a media device 120 may demodulate and/or decode, if needed, the signals for display on a display device 121, such as on a television set (TV) or a computer monitor. The media device 120 may be a demodulator, decoder, frequency tuner, and/or the like. The media device 120 may be directly connected to the network 116 (e.g., for communications via in-band and/or out-of-band signals of a content delivery network) and/or connected to the network 116 via a communication terminal 122 ("CT") (e.g., for communications via a packet switched network). The media device 120 may be a set-top box, a digital streaming device, a gaming device, a media storage device, a digital recording device, a computing device, a mobile computing device (e.g., a laptop, a smartphone, a tablet, etc.), a combination thereof, and/or the like. The media device 120 may implement one or more applications, such as content viewers, social media applications, news applications, gaming applications, content stores, electronic program guides, and/or the like. Those skilled in the art will appreciate that the signal may be demodulated and/or decoded in a variety of equipment, including the communication terminal 122, a computer, a TV, a monitor, or a satellite dish.

The communication terminal 122 may be located at the user location 119. The communication terminal 122 may be configured to communicate with the network 116. The communication terminal 122 may be a modem (e.g., cable modem), a router, a gateway, a switch, a network terminal (e.g., optical network unit), and/or the like. The communication terminal 122 may be configured for communication with the network 116 via a variety of protocols, such as internet protocol, transmission control protocol, file transfer protocol, session initiation protocol, voice over internet protocol, and/or the like. The communication terminal 122, for a cable network, may be configured to provide network access via a variety of communication protocols and standards, such as Data Over Cable Service Interface Specification (DOCSIS).

A first access point 123 (e.g., a wireless access point) may be located at the user location 119. The first access point 123 may be configured to provide one or more wireless networks in at least a portion of the user location 119. The first access point 123 may be configured to provide access to the network 116 to devices configured with a compatible wireless radio, such as a mobile device 124, the media device 120, the display device 121, or other computing devices (e.g., laptops, sensor devices, security devices). The first access point 123 may provide a user managed network (e.g., local area network), a service provider managed network (e.g., public network for users of the service provider), and/or the like. It should be noted that in some configurations, some or all of the first access point 123, the communication terminal 122, the media device 120, and the display device 121 may be implemented as a single device.

The user location 119 may not necessarily be fixed. A user may receive content from the network 116 on the mobile device 124. The mobile device 124 may be a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 may communicate with a variety of access points (e.g., at different times and locations or simultaneously if within range of multiple access points). The mobile device 124 may communicate with a second access point 125. The second access point 125 may be a cell tower, a wireless hotspot, another mobile device, and/or other remote access point. The second access point 125 may be within range of the user location 119 or remote from the user location 119. The second access point 125 may be located along a travel route, within a business or residence, or other useful locations (e.g., travel stop, city center, park, etc.).

The system 100 may have an application server 126. The application server 126 may provide services related to applications. The application server 126 may have an application store. The application store may be configured to allow users to purchase, download, install, upgrade, and/or otherwise manage applications. The application server 126 may be configured to allow users to download applications to a device, such as the mobile device 124, communications terminal 122, the media device 120, the display device 121, and/or the like. The application server 126 may run one or more application services to send data, handle requests, and/or otherwise facilitate operation of applications for the user.

The system 100 may have one or more content sources 127. The content source 127 may be configured to send content (e.g., video, audio, games, applications, data) to the user. The content source 127 may be configured to send streaming media, such as on-demand content (e.g., video on-demand), content recordings, and/or the like. The content source 127 may be managed by third party content providers, service providers, online content providers, over-the-top content providers, and/or the like. The content may be provided via a subscription, by individual item purchase or rental, and/or the like. The content source 127 may be configured to send the content via a packet switched network path, such as via an internet protocol (IP) based connection. The content may be accessed by users via applications, such as mobile applications, television applications, set-top box applications, gaming device applications, and/or the like. An application may be a custom application (e.g., by content provider, for a specific device), a general content browser (e.g., web browser), an electronic program guide, and/or the like.

The system 100 may have an edge device 128. The edge device 128 may be configured to provide content, services, and/or the like to the user location 119. The edge device 128 may be one of a plurality of edge devices distributed across the network 116. The edge device 128 may be located in a region proximate to the user location 119. A request for content from the user may be directed to the edge device 128 (e.g., due to the location of the edge device and/or network conditions). The edge device 128 may be configured to receive packaged content (e.g., from the central location 101 and/or any of the sources 102a, 102b, or 102c) for delivery to the user, convert content for delivery to the user (e.g., in a specific format requested by a user device), send the user a manifest file (e.g., or other index file describing portions of the content), send streaming content (e.g., unicast, multicast), provide a file transfer, and/or the like. The edge device 128 may cache or otherwise store content (e.g., frequently requested content) to enable faster delivery of content to users.

The edge device 128 may receive a request for content from the user location 119. The edge device 128 may receive a request for content from a client device (e.g., the media device 120, the communication terminal 122, etc.). The edge device 128 may establish a communication link with the client device. The edge device 128 may determine whether the edge device 128 has access to the requested content. The edge device 128 may determine whether the edge device 128 has access to the requested content after receiving the request for content from the client device. The edge device 128 may determine whether a cache associated with the edge device 128 has the requested content (e.g., a mid-tier cache, such as the central location 101). If the edge device 128 does not have access to the requested content, the edge device 128 may request the requested content from the central location 101, a different edge device 128 and/or the content source 127.

The edge device 128 may establish a communication link with the central location 101, a different edge device 128 and/or the content source 127 to receive the requested content. The edge device 128 may track the content received from the central location 101, a different edge device 128 and/or the content source 127. The control system 118 may determine that the central location 101 does not have access to the requested content. The control system 118 may establish a communication link with input source 102a (e.g., based on the request for the content). The input source 102a may send a redirect message to the control system 118 indicating that the requested content is available from input source 102b. The central location may receive the requested content from input source 102b and provide the requested content to the edge device 128 for delivery to the user.

The network 116 may have a network component 129. The network component 129 may be any device, module, and/or the like communicatively coupled to the network 116. The network component 129 may be a router, a switch, a splitter, a packager, a gateway, an encoder, a storage device, a multiplexer, a network access location (e.g., tap), physical link, and/or the like.

FIG. 2 shows a system 200 for content delivery. The system 200 may receive content from a content source 202 at a datacenter 204 (e.g., input source 102a, 102b, 102c of FIG. 1). The system 200 may receive content from the content source 202 at a datacenter 214 (e.g., input source 102a, 102b, 102c of FIG. 1). The content may be sent from the content source 202 to the datacenter 204 and/or the datacenter 214 via a variety of transmission paths, including a wireless path (e.g., satellite paths 103a, 103b) and/or a terrestrial path (e.g., terrestrial path 104). The system 200 may have a mid-tier cache 224 (e.g., any of the caching devices shown in FIG. 1 or in FIGS. 3-8). The system 200 may be a content distribution network. While not shown for ease of explanation, a person skilled in the art would appreciate that the system 200 may have any number of content sources 202, datacenters 204, 214, and mid-tier caches 224.

The datacenter 204 may have a transcoder 206, a video quality ("VQ") measurer 208, a packager 210, and a video quality ("VQ") agent 212. The transcoder 206 may receive a first portion of a content item from content source 202, encode (e.g., format) the received first portion of the content item, and send the encoded first portion of the content item as well as other data (e.g., a score determined by the packager 210 based on the encoded first portion of the content item) to the packager 210. The VQ measurer 208 may receive the encoded first portion of the content item (e.g., as well as the score determined by the packager 210) from the transcoder 206 and determine an associated transcoded quality level. The VQ measurer 208 may determine a first quality level based on the transcoded quality level, a source quality level associated with the content source 202 and the content item, the score determined by the packager 210; and/or a packaged quality level associated with the one or more portions of the content item previously packaged by the packager 210. The VQ measurer 208 may send an indication of the first quality level associated with the encoded first portion of the content item (e.g., an indication of a level of quality associated with the encoded first portion of the content item) to the VQ agent 212. The VQ measurer 208 may also send an indication of one or more of the transcoded quality level, the source quality level, the score determined by the packager 210; and/or the packaged quality level to the VQ agent 212.

The VQ agent 212 may determine the first quality level rather than the VQ measurer 208. Put differently, the VQ agent 212 may receive the first portion of the content item from the content source 202 and the encoded first portion of the content item from the transcoder 206. The VQ agent 212 may determine the first quality level by comparing the first portion of the content item received from the content source 202 to the encoded first portion of the content item received from the transcoder 206 (e.g., to determine whether the portion has been properly encoded). The transcoder 206 may send the encoded first portion of the content item to the packager 210 for packaging of the encoded first portion of the content item for delivery to the mid-tier cache 224.

The packager 210 may send to the VQ agent 212 an indication of one or more packaging errors associated with the packaged first portion of the content item. The one or more packaging errors may be based on one or more packaging errors (e.g., a loss of a packet identifier associated with the packaged first portion of the content item, an encoder boundary point misalignment associated with the packaged first portion of the content item, a loss of an audio packet identifier associated with the packaged first portion of the content item, a change in metadata associated with the content item, or any other aspect of packaging the content item that may be observable by the packager 210). The VQ agent 212 may determine a first service metric associated with the first portion of the content item encoded by the transcoder 206 and/or the first portion of the content item packaged by the packager 210. The first service metric may be based on the first quality level associated with the first portion of the content item encoded by the transcoder 206; the transcoded quality level, the source quality level, the score determined by the packager 210; the packaged quality level and/or the one or more packaging errors associated with the first portion of the content item packaged by the packager 210. The VQ agent 212 may permit the packager 210 to deliver the packaged first portion of the content item to the mid-tier cache 224 based on the first service metric satisfying a threshold (e.g., a video quality threshold). The VQ agent 212 may disable the packager 210 from delivering the packaged first portion of the content item to the mid-tier cache 224 based on the first service metric not satisfying a threshold (e.g., a video quality threshold).

The datacenter 214 may have a transcoder 216, a video quality ("VQ") measurer 218, a packager 220, and a video quality ("VQ") agent 222. The transcoder 216 may receive the first portion of the content item from content source 202, encode (e.g., format) the received first portion of the content item, and send the encoded first portion of the content item as well as other data (e.g., a score determined by the packager 220 based on the encoded first portion of the content item) to the packager 220. The VQ measurer 218 may receive the encoded first portion of the content item (e.g., as well as the score determined by the packager 220) from the transcoder 216 and determine an associated transcoded quality level. The VQ measurer 218 may determine a first quality level based on the transcoded quality level, a source quality level associated with the content source 202 and the content item, the score determined by the packager 220; and/or a packaged quality level associated with the one or more portions of the content item previously packaged by the packager 220. The VQ measurer 218 may send an indication of a second quality level associated with the encoded first portion of the content item (e.g., an indication of a level of quality associated with the encoded first portion of the content item) to the VQ agent 222. The VQ measurer 218 may also send an indication of one or more of the transcoded quality level, the source quality level, the score determined by the packager 220; and/or the packaged quality level to the VQ agent 212. The VQ agent 218 may determine the second quality level rather than the VQ measurer 218. Put differently, the VQ agent 218 may receive the second portion of the content item from the content source 202 and the encoded second portion of the content item from the transcoder 206. The VQ agent 212 may determine the second quality level by comparing the second portion of the content item received from the content source 202 to the encoded second portion of the content item received from the transcoder 216 (e.g., to determine whether the portion has been properly encoded). The transcoder 216 may send the encoded first portion of the content item to the packager 220 for packaging of the encoded first portion of the content item for delivery to the mid-tier cache 224.

The transcoder 206 may establish a communication link with the transcoder 216. The transcoder 206 and the transcoder 216 may use the communication link to synchronize an alignment of a video portion of the content item, an audio portion of the content item (e.g., audio metadata), label(s) associated with the content item, encoder boundary points, advertisement insertion signals, an alignment indication flag for each encoded portion of the content item, and the like. The transcoder 206 and the transcoder 216 may use the communication link to synchronize the first portion of the content item to be encoded (e.g., to ensure the first portion of the content item encoded by the transcoder 206 corresponds to the first portion of the content item encoded by the transcoder 216). The transcoder 206 and the transcoder 216 may synchronize the first portion of the content item to be encoded based on a manifest file associated with the content item (e.g., received from the source), a name or identifier associated with the first portion of the content item, an encoder boundary point associated with the first portion of the content item, and/or the like.

The packager 220 may send an indication of one or more packaging errors associated with the packaged first portion of the content item to the VQ agent 222. The one or more packaging errors may be based on one or more packaging errors (e.g., a loss of a packet identifier associated with the packaged first portion of the content item, an encoder boundary point misalignment associated with the packaged first portion of the content item, a loss of an audio packet identifier associated with the packaged first portion of the content item, a change in metadata associated with the content item, or any other aspect of packaging the content item that may be observable by the packager 220). The VQ agent 212 may determine a second service metric associated with the first portion of the content item encoded by the transcoder 216 and/or the first portion of the content item packaged by the packager 220. The second service metric may be based on the second quality level associated with the first portion of the content item encoded by the transcoder 216; the one or more packaging errors associated with the first portion of the content item packaged by the packager 220; the transcoded quality level, the source quality level, the score determined by the packager 210; and/or the packaged quality level. The VQ agent 222 may permit the packager 220 to deliver the packaged first portion of the content item to the mid-tier cache 224 based on the second service metric satisfying a threshold (e.g., a video quality threshold). The VQ agent 222 may disable the packager 220 from delivering the packaged first portion of the content item to the mid-tier cache 224 based on the second service metric not satisfying a threshold (e.g., a video quality threshold).

The first quality level and/or the second quality level may be numerical (e.g., ranging between 0 (indicating poor service quality) to 1 (indicating a high service quality)). The first quality level and/or the second quality level may be based on the first portion of the content item received from the content source 202. The first service metric and/or the second service metric may be numerical (e.g., ranging between 0 (indicating poor service quality) to 1 (indicating a high service quality)). Each of the one or more packaging errors may be associated with a numerical score (e.g., ranging between −1 (indicating a higher-impact packaging error) to 0 (indicating a lower-impact packaging error); ranging between 1 (indicating a higher-impact packaging error) to 0 (indicating a lower-impact packaging error); a percentage (positive or negative), and the like). The first service metric may be based on a weighted average of the first quality level and a numerical score(s) associated with a packaging error(s). The second service metric may be based on a weighted average of the second quality level and a numerical score(s) associated with a packaging error(s). The VQ agent 212 may establish a communication link with the VQ agent 222. Though FIG. 2 shows a single connection path between the VQ agents 212, 222, one of skill in the art can appreciate that the system 200 may incorporate one or more redundant connection paths between the VQ agents 212, 222 to ensure that a communication link between the VQ agents 212, 222 may be established despite a failure of any given connection path. In this way, the VQ agents 212, 222 may maintain high availability during times of system congestion and/or partial failure.

The VQ agent 212 may establish the communication link with the VQ agent 222 for sending the first service metric to the VQ agent 222. The VQ agent 222 may establish a communication link with the VQ agent 212 for sending the second service metric to the VQ agent 212. The VQ agent 222 may determine that the first service metric is indicative of a higher quality of service, as compared to the second service metric, based on the first service metric satisfying a threshold (e.g., the first service metric is greater than or equal to a threshold service metric) and the second service metric not satisfying the threshold (e.g., the second service metric is less than a threshold service metric). The VQ agent 222 may send the VQ agent 212 an indication that the first service metric satisfies the threshold and the second service metric does not satisfy the threshold. The VQ agent 222 may disable the packager 220 from delivering the packaged content to the mid-tier cache 224 based on the second service metric not satisfying the threshold. The VQ agent 212 may permit the packager 210 to deliver the packaged content to the mid-tier cache 224 based on the first service metric satisfying the threshold.

The packager 210 and/or the packager 220 may communicate with the mid-tier cache 224 (e.g., to send packaged portions of a content item to the mid-tier cache 204). The mid-tier cache 224 may open and/or create a communication link to communicate with the packager 210 and/or the packager 220. The communication link may be based on a first request for a portion of a content item received by the mid-tier cache 224 (e.g., from a first requesting device). The first request for the portion of a content item may indicate that the content item is to be received from a first source. After the communication link is established, the packager 210 and/or the packager 220 may send a portion of the content item received from the first source (e.g., portions of packaged content) to the mid-tier cache 224. The packager 210 and/or the packager 220 may send further portions of the content item from the first source to the mid-tier cache 224 without the mid-tier cache 224 requesting any, or all, of the further portions of the content item from the first source. The packager 210 and/or the packager 220 may send the further portions of the content item from the first source to the mid-tier cache 224 based on a second request received (e.g., by the packager 210, the packager 220, the VQ agent 212, and/or the VQ agent 222) from the mid-tier cache 224. The second request may indicate that the further portions of the content item are to be received from a second source (e.g., a second requesting device may request the content item from the second source via the mid-tier cache 224). Based on the second request, the VQ agent 212 and/or the VQ agent 222 may determine that the packager 210 and/or the packager 220 already received the further portions of the content item from a source other than the second source (e.g., from the first source). The VQ agent 212 and/or the VQ agent 222 may cause the packager 210 and/or the packager 220 to send the further portions of the content item received from the source other than the second source (e.g., the first source) to the mid-tier cache 224.

The VQ agent 212 and/or the VQ agent 222 may send an indication to the packager 210 that the packager 210 may provide the content item on behalf of the packager 220 (e.g., the packager 210 may deliver the content item to a requesting device that expects to receive the content item from the packager 220). The packager 210 may include origination information (e.g., via a hypertext transfer protocol header) associated with the content item as part of providing any portion of the content item to the mid-tier cache 224. The VQ agent 212 and/or the VQ agent 222 may send an indication to the packager 220 that the packager 220 may provide the content item on behalf of the packager 210 (e.g., the packager 220 may deliver the content item to a requesting device that expects to receive the content item from the packager 210). The packager 220 may include origination information (e.g., via a hypertext transfer protocol header) associated with the content item as part of providing any portion of the content item to the mid-tier cache 224. In this way, the mid-tier cache 224 may provide the content item to a requesting device in response to one or more further requests for the content item received by the mid-tier cache 224 from the requesting device, regardless of which source is indicated in the one or more further requests. Put differently, the mid-tier cache 244 may determine based on the origination information that any further request for the content item indicating that the content item should be retrieved from a source associated with a given packager (e.g., packager 220) may be fulfilled (e.g., the content item may be served to the requesting device) using portion(s) of the content item received by the mid-tier cache 244 from any packager (e.g., packager 210) included in the origination information.

While the system 200 as described and shown in FIG. 2 has one content source 202, two datacenters 204, 216, and one mid-tier cache 224 for ease of explanation, a person skilled in the art would appreciate there could be a plurality of each of these features. Also, while a single communication link is shown between several of the features of the system 200 as shown in FIG. 2, a person skilled in the art would appreciate there may be multiple communication links between these features, such as a communication link for a manifest, another communication link for video content, a third communication link for audio content, and so forth.

Figure 3:
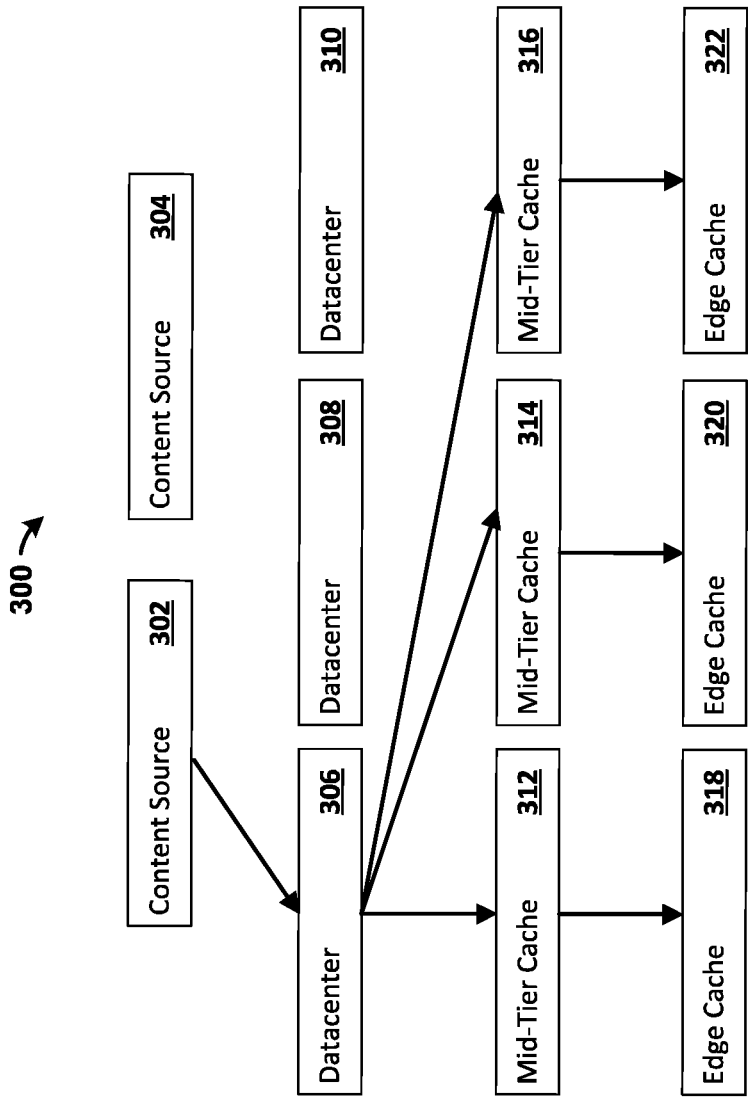
FIG. 3 shows a system for delivering content.

FIG. 3 shows a system 300 for distributing content from an origination (e.g., a source) to a device (e.g., a user device for consuming content). While FIG. 3 shows connection pathways (e.g., communication links) between certain devices, it is to be understood that the connection pathways as shown are for illustrative purposes only and that any of the devices depicted in FIG. 3 may communicate with any other device depicted therein.

The system 300 may have a content source 302 (e.g., the content source 127 of FIG. 1 and/or content source 202 of FIG. 2) and a content source 304 (e.g., content source 127 of FIG. 1 and/or content source 202 of FIG. 2). Each of the content sources 302, 304 may provide content to each of datacenter 306 (e.g., input sources 102a, 102b, 102c, 106 of FIG. 1 and/or datacenter 204 or datacenter 214 of FIG. 2), datacenter 308 (e.g., input sources 102a, 102b, 102c, 106 of FIG. 1 and/or datacenter 204 or datacenter 214 of FIG. 2), and datacenter 310 (e.g., input sources 102a, 102b, 102c, 106 of FIG. 1 and/or datacenter 204 or datacenter 214 of FIG. 2). Each of the datacenters 306, 308, 310 may provide content (e.g., received from content source 302 and/or content source 304) to each of mid-tier cache 312 (e.g., central location 101 of FIG. 1 and/or mid-tier cache 224 of FIG. 2), mid-tier cache 314 (e.g., central location 101 of FIG. 1 and/or mid-tier cache 224 of FIG. 2), and mid-tier cache 316 (e.g., central location 101 of FIG. 1 and/or mid-tier cache 224 of FIG. 2). Each of the mid-tier caches 312, 314, 316 may provide content (e.g., received from datacenter 304, datacenter 308, and/or datacenter 310) to each of edge cache 318 (e.g., edge device 128 of FIG. 1), edge cache 320 (e.g., edge device 128 of FIG. 1), and edge cache 322 (e.g., edge device 128 of FIG. 1).

The system 300 may be configured to provide origination information (e.g., via a hypertext transfer protocol header) associated with a requested content item as the content item is being distributed throughout the system 300 (e.g., from a content source 302, 304 to an edge cache 318, 320, 322). The edge cache 318 may send a request for a content item to be delivered from content source 302. The mid-tier cache 312 may receive the request for the content item and determine that it does not have the content item from the content source 302 stored in cache. The mid-tier cache 312 may then request that the content item be delivered from the content source 302 via the datacenter 306. The datacenter 306 may receive the request for the content item from the mid-tier cache 312 and determine that it does not have the content item from the content source 302 stored in cache. The datacenter 306 may request the content item from the content source 302.

The request for the content item may have a first hypertext transfer protocol ("HTTP") header indicating that the content item is to be received from the content source 302. The first HTTP header may be formatted as shown below:

GET /first_content_item.m3u8

HTTP/1.1

Host: source1.net

User-Agent: curl/7.54.0

Accept: */*

The content source 302 may provide the content item as well as origination information associated with the content item. The origination information may have a second HTTP header indicating that the content item was received from the content source 302. The second HTTP header may also indicate that the content item is available from the content source 304. The second HTTP header may be formatted as shown below:

HTTP/1.1 200 OK

Date: Wed, 07 Nov 2018 16:28:27 GMT

Server: Pillar/1.11.3

Last-Modified: Wed, 07 Nov 2018 16:28:24 GMT

Content-Length: 11253

Content-Type: application/vnd.apple.mpegurl

Age: 2

Connection: keep-alive

Origins: source1.net, source2.net

The datacenter 306 may receive the content item as well as the origination information from the content source 302. The datacenter 306 may send the origination information (e.g., via a VQ agent of the datacenter 306) as well as an indication that the datacenter 306 received the content item from the content source 302 to the datacenter 308 (e.g., via a VQ agent of datacenter 308) and/or the datacenter 310 (e.g., via a VQ agent of datacenter 310). The content item may be sent by the datacenter 306 to the mid-tier cache 312, which may send the first content item to the edge cache 318.

The edge cache 320 may send a request for the content item to be delivered from the content source 304. The mid-tier cache 314 may receive the request from the edge cache 320 and determine that it does not have the content item from the content source 304 stored in cache. The mid-tier cache 314 may then request that the content item be delivered from the content source 304 via the datacenter 308. The datacenter 308 may receive the request from the mid-tier cache 314 and determine that it does not have the content item from the content source 304 stored in cache. The datacenter 308 may determine, based on the origination information and the indication received from the datacenter 306, that the content item is also available from the content source 302 and that the datacenter 306 has already received the content item from the content source 302. The datacenter 308 may then request (e.g., via VQ agent 222) that the datacenter 306 provide the content item to the mid-tier cache 314 (e.g., despite the request from the mid-tier cache 314 indicating that the content item was to be delivered by the content source 304). The mid-tier cache 314 may send the content item received from the datacenter 306 to the edge cache 320.

Each of the datacenter 308 and the datacenter 310 may have a transcoder (e.g., transcoder 206, 216 of FIG. 2), a VQ measurer (e.g., VQ measurer 208, 218 of FIG. 2), a packaging device (e.g., packager 210, 220 of FIG. 2), and a VQ agent (e.g., VQ agent 212, 222 of FIG. 2). The datacenter 308 may receive a portion of the content item from the content source 302 based on a request for the portion of the content item received by the datacenter 308 from the mid-tier cache 314. The datacenter 310 may receive the portion of the content item from the content source 304 based on a request for the portion of the content item received by the datacenter 310 from the mid-tier cache 316.

The datacenter 308 may establish a communication link with the datacenter 310. The datacenter 308 may use the communication link to provide the origination information associated with the content item to the datacenter 310. The datacenter 308 and the datacenter 310 may use the communication link to synchronize the portion of the content item to be encoded (e.g., to ensure the portion of the content item encoded by the transcoder of the datacenter 308 corresponds to the portion of the content item encoded by the transcoder of the datacenter 310).

The transcoder of the datacenter 308 may encode (e.g., format) the portion of the content item received from content source 302 and send the encoded portion of the content item to the packager of the datacenter 308. The VQ measurer of the datacenter 308 may send an indication of a quality level associated with the encoded portion of the content item received from the content source 302 (e.g., an indication of a level of quality associated with the encoded portion of the content item) to the VQ agent of the datacenter 308. The VQ agent of the datacenter 308 may determine the quality level rather than the VQ measurer of the datacenter 308. Put differently, the VQ agent of the datacenter 308 may receive the portion of the content item from the content source 302 and the encoded portion of the content item from the transcoder of the datacenter 308. The VQ agent of datacenter 308 may determine the quality level by comparing the portion of the content item received from the content source 302 to the encoded portion of the content item received from the transcoder of the datacenter 308 (e.g., to determine whether the portion has been properly encoded). The transcoder of the datacenter 308 may send the encoded portion of the content item received from the content source 302 to the packager of datacenter 308 for packaging of the encoded first portion of the content item for delivery to the mid-tier cache 314.

The packager of the datacenter 308 may send an indication of one or more packaging errors associated with the packaged portion of the content item received from the content source 302 to the VQ agent of the datacenter 308. The VQ agent of the datacenter 308 may determine a service metric associated with the portion of the content item received from the content source 302 based on the portion of the content item encoded by the transcoder of the datacenter 308 and/or the portion of the content item packaged by the packager of the datacenter 308.

The transcoder of the datacenter 310 may encode (e.g., format) the portion of the content item received from the content source 304 and send the encoded portion of the content item to the packager of the datacenter 310. The VQ measurer of the datacenter 310 may send an indication of a quality level associated with the encoded portion of the content item received from the content source 304 (e.g., an indication of a level of quality associated with the encoded portion of the content item) to the VQ agent of the datacenter 310. The VQ agent of the datacenter 310 may determine the quality level rather than the VQ measurer of the datacenter 310. Put differently, the VQ agent of the datacenter 310 may receive the portion of the content item from the content source 304 and the encoded portion of the content item from the transcoder of the datacenter 308. The VQ agent of the datacenter 310 may determine the quality level by comparing the portion of the content item received from the content source 304 to the encoded portion of the content item received from the transcoder of the datacenter 310 (e.g., to determine whether the portion has been properly encoded). The transcoder of the datacenter 310 may send the encoded portion of the content item received from the content source 304 to the packager of the datacenter 310 for packaging of the encoded first portion of the content item for delivery to the mid-tier cache 316.

The packager of the datacenter 310 may send an indication of one or more packaging errors associated with the packaged portion of the content item received from the content source 304 to the VQ agent of the datacenter 310. The VQ agent of the datacenter 310 may determine a service metric associated with the portion of the content item received from the content source 304 based on the portion of the content item encoded by the transcoder of the datacenter 310 and/or the portion of the content item packaged by the packager of the datacenter 310.

The VQ agent of the datacenter 308 may establish a communication link with the VQ agent of the datacenter 310 for sending the service metric associated with the portion of the content item received from the content source 302 to the VQ agent of the datacenter 310. The VQ agent of the datacenter 310 may establish a communication link with the VQ agent of the datacenter 308 for sending the service metric associated with the portion of the content item received from the content source 304 to the VQ agent of the datacenter 308. The VQ agent of the datacenter 308 may determine that the service metric associated with the portion of the content item received from the content source 302 is indicative of a higher quality of service as compared to the service metric associated with the portion of the content item received from the content source 304 (e.g., based on the service metric associated with the portion of the content item received from the content source 302 satisfying a threshold and the service metric associated with the portion of the content item received from the content source 304 not satisfying the threshold). The VQ agent of the datacenter 308 may send the VQ agent of the datacenter 310 an indication that the service metric associated with the portion of the content item received from the content source 302 satisfies a threshold and the second service metric associated with the portion of the content item received from the content source 304 does not satisfy the threshold.

The VQ agent of the datacenter 310 may disable the packager of the datacenter 310 from delivering the packaged portion of the content item to the mid-tier cache 316 based on the service metric associated with the portion of the content item received from the content source 304 not satisfying the threshold. The VQ agent of the datacenter 310 may permit the packager of the datacenter 310 to deliver the packaged portion of the content item to the mid-tier cache 316 and/or the mid-tier cache 314 based on the service metric associated with the portion of the content item received from the content source 302 satisfying the threshold.

In an instance where a VQ agent associated with a datacenter 306, 308, or 310 cannot communicate with one or more of the other VQ agents in the other datacenters (an "offline VQ agent), content may nevertheless be provided by the transcoder associated with the offline VQ agent. The mid-tier cache 314 may receive a request from a requesting device for a portion of a content item, which may be sent by the mid-tier cache 314 to the datacenter associated the offline VQ agent. Despite not being not in communication with one or more of the other VQ agents, the offline VQ agent may cause its corresponding transcoder (e.g., located at the same datacenter as the offline VQ agent) to provide the requested portion of the content item to the mid-tier cache 314 (e.g., without providing origination information associated with the content item).

Figure 4:
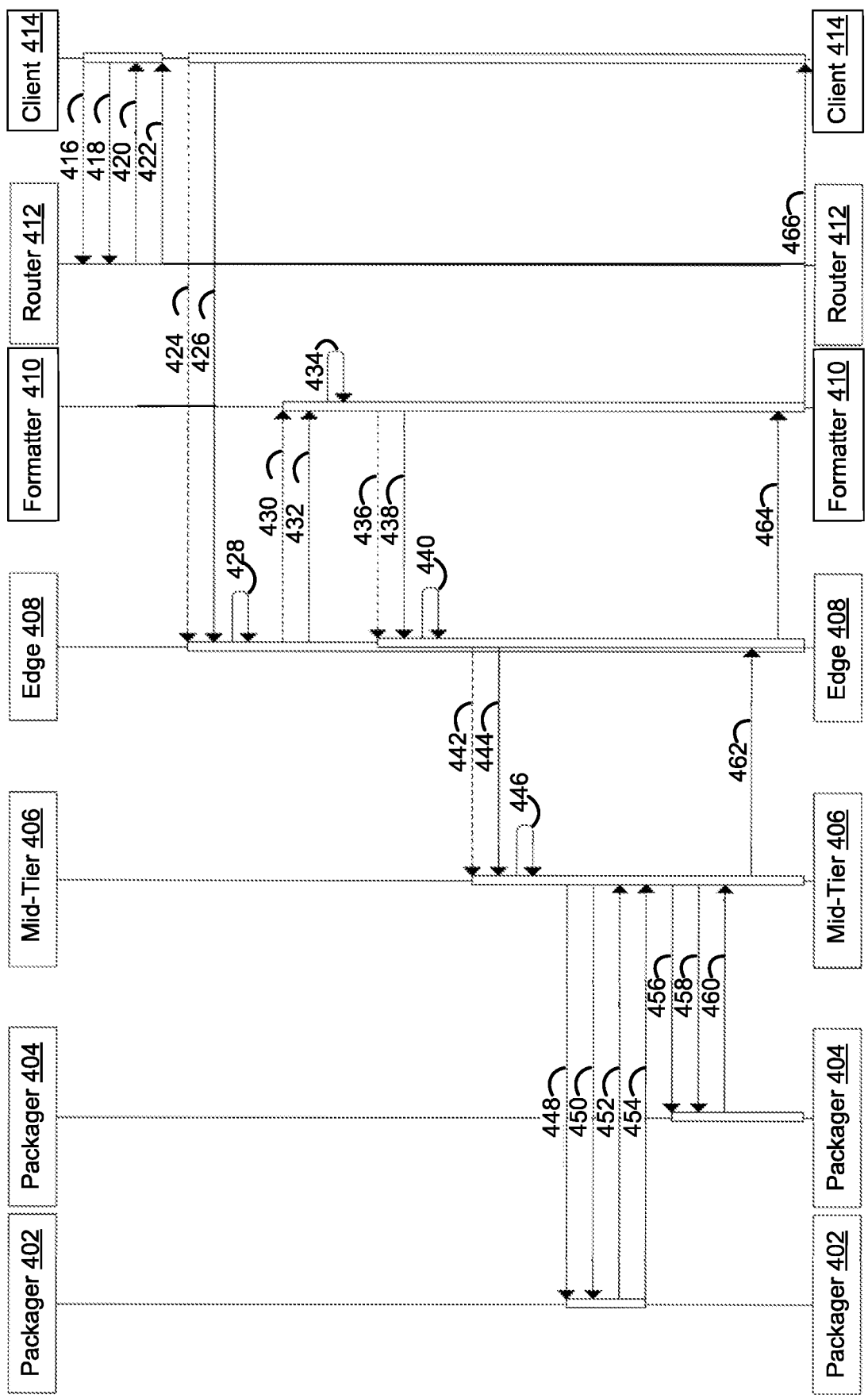
FIG. 4 shows a series of communication flows for a system for delivering content.

FIG. 4 shows a plurality of communication flows that the system 100 of FIG. 1, the system 200 of FIG. 2, and/or the system 300 of FIG. 3 may implement when distributing content in accordance with the present description. At communication flow 416, a client 414 (e.g., the media device 120 or the mobile device 124 of FIG. 1) may establish a communication link (e.g., a transport control protocol session) with a router 412 (e.g., first access point 123 of FIG. 1) in order to request a content item. In establishing the communication link, the client 414 may send a content request to the router 412 at communication flow 418. The content request (e.g., a HTTP 1.1 GET request) may be a request to receive a first manifest associated with the content item (e.g., an MPEG-DASH manifest, or the like). At communication flow 420, the router 412 may send a message to the client 414 (e.g., a HTTP 302 redirect) instructing the client 414 to request the first manifest from edge device 408 (e.g., edge device 128 of FIG. 1; or edge cache 318, edge cache 320, or edge cache 322 of FIG. 3). At communication flow 422, the router 414 may terminate (e.g., close) the established communication link with the client 414.

At communication flow 424, the client 414 may establish a communication link (e.g., a transport control protocol session) with the edge device 408 based on the message received from the router 412 instructing the client 414 to request the first manifest from edge device 408. In establishing the communication link with the edge device 408, the client 414 may send a content request at communication flow 426. The content request sent by the client 414 to the edge device 408 may be a request to receive the first manifest (e.g., via a HTTP 1.1 GET request). At communication flow 428, the edge device 408 may determine that the first manifest is not stored in a cache of the edge device 408. At communication flow 430, the edge device 408 may establish a communication link (e.g., a transport control protocol session) with a formatter 410 (e.g., a device that converts a content item from a first format to a second format for delivery to a client) based on the determination that the first manifest is not stored in the cache of the edge device 408. In establishing the communication link with the formatter 410, the edge device 408 may send a content request to the formatter 410 at communication flow 432. The content request sent to the formatter 410 may be a request to receive the first manifest (e.g., via a HTTP 1.1 GET request). At communication flow 434, the formatter 410 may determine that the first manifest is not stored in a cache of the formatter 410. At communication flow 436, the formatter 410 may establish a communication link (e.g., a transport control protocol session) with the edge device 408 based on the determination that the first manifest is not stored in the cache of the formatter 410. In establishing the communication link with the edge device 408, the formatter 410 may send a content request to the edge device 408 at communication flow 438. The request sent to the edge device 408 at communication flow 438 may be a request (e.g., via a HTTP 1.1 GET request) to receive an origin manifest associated with the content item (e.g., a common intermediate format ("CIF") manifest, or the like).

At communication flow 440, the edge device 408 may determine that the origin manifest is not stored in a cache of the edge device 408. At communication flow 442, the edge device 408 may establish a communication link (e.g., a transport control protocol session) with a mid-tier cache 406 (e.g., central location 101 of FIG. 1; mid-tier cache 224 of FIG. 2; mid-tier cache 312, mid-tier cache 314, or mid-tier cache 316 of FIG. 3). The edge device 408 may establish the communication link with the mid-tier cache 406 based on the determination that the origin manifest is not stored in the cache of the edge device 408. In establishing the communication link with the mid-tier cache 406, the edge device 408 may send a content request to the mid-tier cache 406 at communication flow 444. The request sent to the mid-tier cache 406 at communication flow 444 may be a request (e.g., via a HTTP 1.1 GET request) to receive the origin manifest associated with the content item.

At communication flow 446, the mid-tier cache 406 may determine that the origin manifest is not stored in a cache of the mid-tier cache 406. At communication flow 448, the mid-tier cache 406 may establish a communication link (e.g., a transport control protocol session) with a packager 402 (e.g., combiner 117 of FIG. 1 or packager 210, 220 of FIG. 2) based on the determination that the origin manifest is not stored in the cache of the mid-tier cache 406. In establishing the communication link with the packager 402, the mid-tier cache 406 may send a content request to the packager 402 at communication flow 450. The request sent to the packager 402 at communication flow 450 may be a request (e.g., via a HTTP 1.1 GET request) to receive the origin manifest associated with the content item. At communication flow 452, the packager 402 may send a message to the mid-tier cache 406 (e.g., a HTTP 302 redirect) instructing the mid-tier cache 406 to request the origin manifest from packager 404 (e.g., combiner 117 of FIG. 1 or packager 210, 220 of FIG. 2). The packager 402 may send the instruction to request the origin manifest from packager 404 based on a determination (e.g., by a VQ agent associated with the packager 402 and the packager 404) that a portion of the content item packaged by packager 404 is of a higher quality (e.g., based on a service metric) than the portion of the content item packaged by packager 402. At communication flow 454, the packager 402 may terminate (e.g., close) the established communication link with the mid-tier cache 406.

At communication flow 456, the mid-tier cache 406 may establish a communication link (e.g., a transport control protocol session) with the packager 404 based on the message received from the packager 402 instructing the mid-tier cache 406 to request the origin manifest from packager 404. In establishing the communication link with the packager 404, at communication flow 458 the mid-tier cache 406 may send a content request to the packager 404. The request sent to the packager 402 at communication flow 458 may be a request (e.g., via a HTTP 1.1 GET request) to receive the first manifest associated with the content item. At communication flow 460 the packager 404 may send the origin manifest associated with the content item to the mid-tier cache 406 (e.g., via a HTTP 1.1 200 OK message). At communication flow 462, the mid-tier cache 406 may send the origin manifest associated with the content item to the edge device 408. At communication flow 464, the edge device 408 may send the origin manifest associated with the content item to the formatter 410. At communication flow 466, the formatter 410 may send the content item to the client 414 in a format that is acceptable to (e.g., compatible with) the client 414. Though not depicted in FIG. 4, the formatter 410 may send the content item (e.g., in the format that is acceptable to the client 414) to the edge device 408. The edge device 408 may store (e.g., cache) the content item as-received by the formatter 510 (e.g., to permit delivery of the content item to other clients that require the content item in a format as-received by the edge device 408 from the formatter 410).

Figure 5:
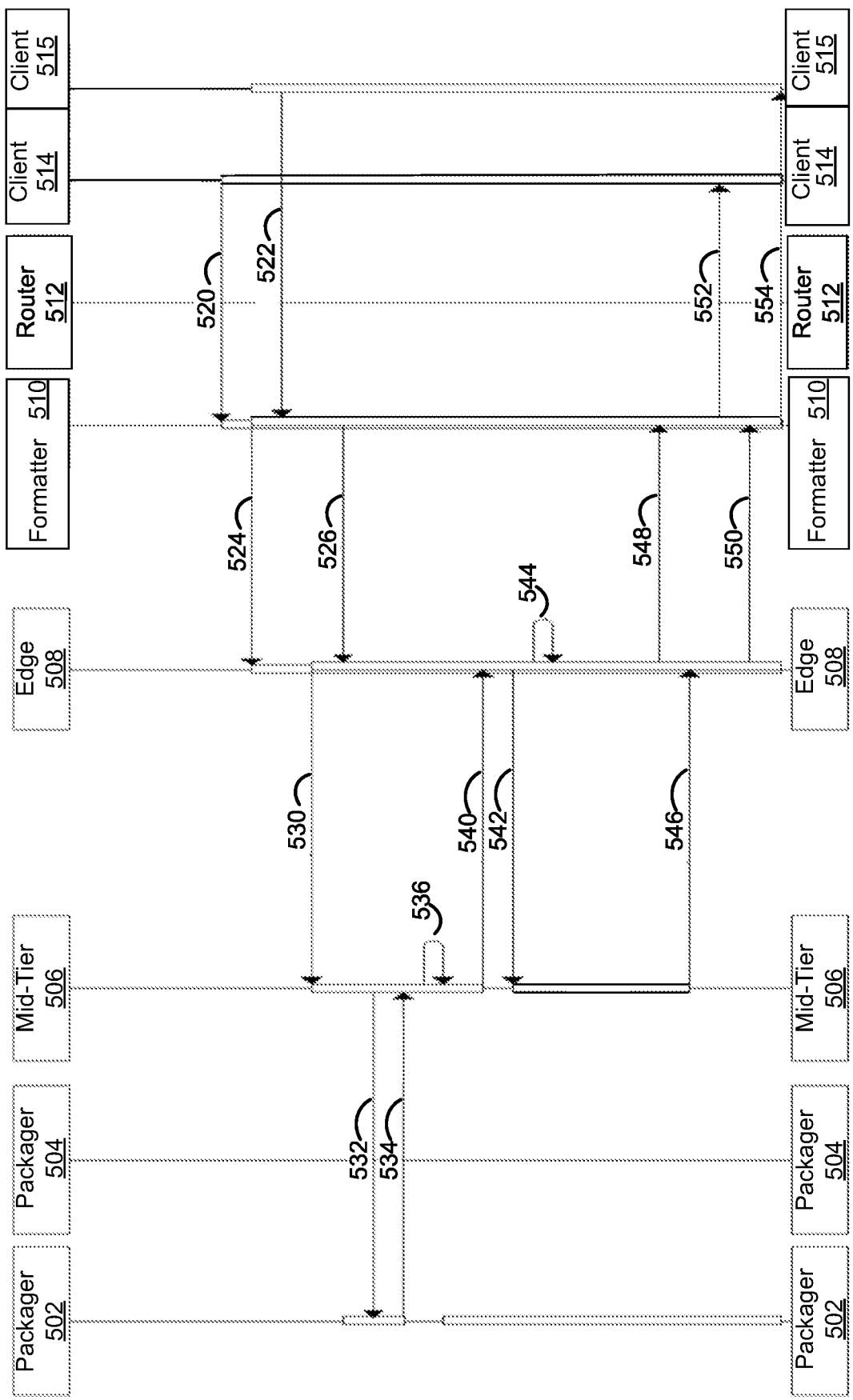
FIG. 5 shows a series of communication flows for a system for delivering content.

FIG. 5 shows a plurality of communication flows that the system 100 of FIG. 1, the system 200 of FIG. 2, and/or the system 300 of FIG. 3 may implement when distributing content in accordance with the present description. At communication flow 520, a client 514 (e.g., media device 120 or mobile device 124 of FIG. 1) may send a request (e.g., via a HTTP 1.1 GET request) for a manifest associated with a content item (e.g., an MPEG-DASH manifest, or the like) to a formatter 510 (e.g., a device that converts a content item from a first format to a second format for delivery to a client). The request at communication flow 520 may indicate (e.g., via a HTTP header) that the manifest is to be received via a first packager 502 (e.g., combiner 117 of FIG. 1 or packager 210, 220 of FIG. 2). The first packager 502 may receive the manifest from a first source (e.g., content source 127 of FIG. 1; content source 202 of FIG. 2; or content source 302, 304 of FIG. 3). At communication flow 522, a client 515 (e.g., media device 120 or mobile device 124 of FIG. 1) may send a request (e.g., via a HTTP 1.1 GET request) for the manifest associated with the content item (e.g., an updated version of a MPEG-DASH manifest, or the like) to the formatter 510. The request at communication flow 522 may indicate (e.g., via a HTTP header) that the manifest is to be received via a second packager 504 (e.g., combiner 117 of FIG. 1 or packager 210, 220 of FIG. 2). The second packager 504 may receive the manifest from a second source (e.g., content source 127 of FIG. 1; content source 202 of FIG. 2; or content source 302, 304 of FIG. 3).

At communication flow 524, the formatter 510 may send the request for the manifest to be delivered from the first packager 502 to an edge device 508 (e.g., edge device 128 of FIG. 1; or edge cache 318, edge cache 320, or edge cache 322 of FIG. 3). At communication flow 526, the formatter 510 may send the request for the manifest to be delivered from the second packager 504 to the edge device 508. At communication flow 530, the edge device 508 may send the request for the manifest to be delivered from the first packager 502 to a mid-tier cache 506 (e.g., central location 101 of FIG. 1; mid-tier cache 224 of FIG. 2; mid-tier cache 312, mid-tier cache 314, or mid-tier cache 316 of FIG. 3). At communication flow 532, the mid-tier cache 506 may send the request for the manifest to the first packager 502. The first packager 502, at communication flow 534, may respond to the request and send (e.g., via a HTTP 1.1 200 OK message) the manifest to the mid-tier cache 506 as well as an origination header (e.g., a HTTP header). The origination header may indicate that further requests for the manifest to be received via packager 504 (e.g., requests indicating that the content item is to be received from a content source associated with packager 504) may be fulfilled (e.g., delivered) by the first packager 502. The first packager 502 may send the origination header based on a determination (e.g., by a VQ agent associated with the packager 502 and the packager 504) that a portion of the content item packaged by packager 502 is of a higher quality (e.g., based on a service metric) than the portion of the content item packaged by packager 504.

At communication flow 536, the mid-tier cache 506 may store the origination header (e.g., in memory). At communication flow 540, based on the origination header, the mid-tier cache 506 may respond to the request to receive the manifest from the first packager 502 by sending to the edge cache 508 an indication (e.g., via a HTTP 1.1 200 OK message) that further requests for the manifest should be delivered by the first packager 502. At communication flow 542, the edge cache 508 may send (e.g., based on the indication that further requests for the manifest should be delivered by the first packager 502) a request for the manifest to be delivered by the first packager 504 At communication flow 544, the edge cache 508 may store the origination header (e.g., in memory). At communication flow 546, the mid-tier cache 506 may send the manifest received from the first packager 502 to the edge device 508. At communication flow 548, the edge device 508 may send the manifest received from the first packager 502 to the formatter 510 for delivery to the client 514. At communication flow 550, the edge device 508 may send the manifest received from the first packager 502 to the formatter 510 for delivery to the client 515. At communication flow 552, the formatter 510 may send the manifest received from the first packager 502 to the client 514, and at communication flow 554 the formatter 510 may send the manifest received from the first packager 502 to the client 515.

Figure 6:
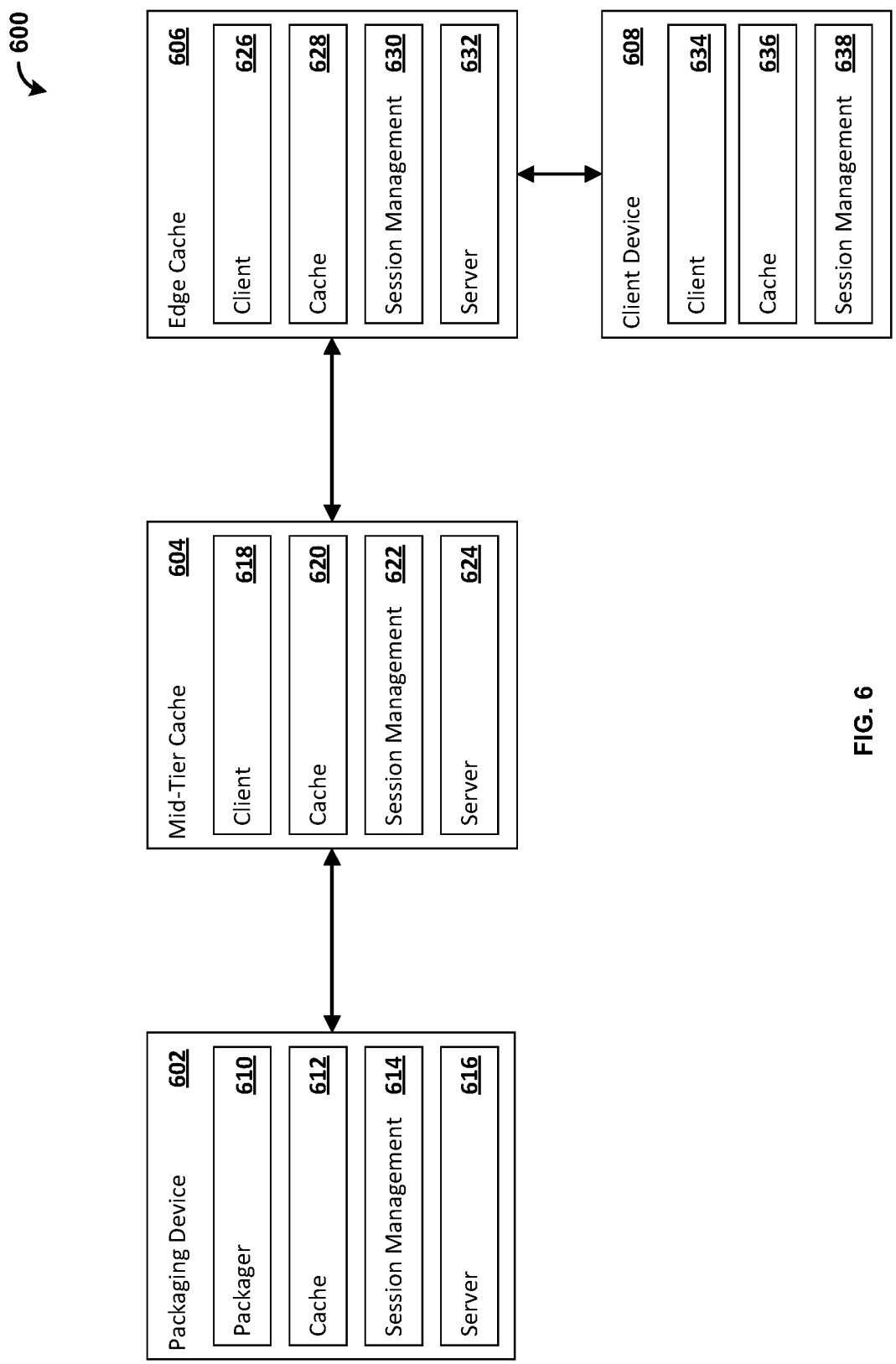
FIG. 6 shows a system for delivering content.

FIG. 6 shows a system 600. The system 600 may have a packaging device 602 (e.g., any of the packagers shown in FIGS. 2-5), a mid-tier cache 604 (e.g., any of the mid-tier caches shown in FIGS. 1-5), an edge cache 606 (e.g., any of the edge devices shown in FIGS. 1-5), and a client device 608 (e.g., the media device 120, the communication terminal 122, and/or the mobile device 124 of FIG. 1). Though not shown in FIG. 6, the system 600 may utilize a VQ agent as described above with respect to FIGS. 2-5. Specifically, the packaging device 602 may send content to another device based on an instruction received from a VQ agent (e.g., the VQ agent may determine that a portion of content packaged by the packager 602 is of a higher quality than the portion packaged by another packager in communication with the VQ agent). While not shown for ease of explanation, a person skilled in the art would appreciate that the system 600 may have any number of packaging devices 602, mid-tier caches 604, edge caches 606, and client devices 608.

As shown, the packaging device 602 may have a packager module 610, a cache 612, a session management module 614, and a server module 616. The packaging device 602 may receive content and package the received content (e.g., using the packager module 610) to send the content to another device (e.g., the mid-tier cache 604). The packaging device 602 may store the received content in the cache 612. The packaging device 602 may also store packaged content ready to be sent to another device in the cache 612. The cache 612 may also remove content after the effective life of the content is ended. The cache 612 may remove data based on a Cache-Control time-to-live protocol.

The server module 616 may be configured to communicate with another device. The server module 616 may communicate with the mid-tier cache 604, as well as send the mid-tier cache 604 with content. The server module 616 may be configured to handle communications from the packaging device 602 to the mid-tier cache 604. Specifically, the server module 616 may open and/or create a communication link to communicate with the mid-tier cache 604. The server module 616 may wait to receive new attempts to establish a communication link for content from a device (e.g., the mid-tier cache 604). When the server module 616 receives a new attempt to establish a communication link, the server module 616 may verify that the requesting device supports a communication protocol that allows the server module 616 to communicate with the requesting device. The server module 616 may verify that the requesting device supports the HTTP 2.0 protocol. When the server module 616 receives the new attempt to establish the communication link, the server module 616 may verify (e.g., authenticate/validate) that the requesting device is authorized to receive the requested content. The server module 616 creates or updates information associated with the requesting device and/or the communication link (e.g., after verifying that the requesting device is authorized to receive the requested content). The server module 616 indicates to the session management module 614 that a new communication link has been established.

The server module 616 may send content to the mid-tier cache tier 604 via the opened/created communication link. After the communication link is established, the server module 616 may send a plurality of content fragments to the requesting device (e.g., the mid-tier cache 604). The server module 616 may push content fragments to the mid-tier cache 604 without the mid-tier cache 604 requesting content. Stated differently, the server module 616 may push content fragments to the mid-tier cache 604 based on the established communication link without the mid-tier cache 604 requesting content, because the server module 616 may determine the content the mid-tier cache 604 needs based on the communication link. The server module 616 may push content fragments to the mid-tier cache 604 without the mid-tier cache 604 requesting additional content. Stated differently, once the mid-tier cache 604 requests content from the packaging device 602, the server module 616 may push the content fragments to the mid-tier cache 604 without the mid-tier cache needing to request each of the content fragments. The server module 616 may continue to push content fragments to the mid-tier cache 604 until the communication link between the packaging device 602 and the mid-tier cache 604 is closed.

The packaging device 602 may have a session management module 614. The session management module 614 may manage some or all established communication links associated with the packaging device 602. The session management module 614 may manage the communication link between the packaging device 602 and the mid-tier cache 604. After the server module 616 establishes a communication link with the mid-tier cache 604, the server module 616 indicates to the session management module 614 that a communication link has been established so that the session management module 614 may manage the newly established communication link. The session management module 614 may then ensure that the mid-tier cache 604 receives content based on the content requested by the mid-tier cache 614. The session management module 614 may send the requested content, as well as any subsequent content, to the mid-tier cache 604. The session management module 614 may push content to the mid-tier cache 604 as soon as the content is available for distribution to the mid-tier cache 604. In this manner, the session management module 614 ensures that the mid-tier cache 604 has the most up to date content without mid-tier cache 604 needing to communicate at regular intervals with the packaging device 602. That is, once the communication link is established between the packaging device 602 and the mid-tier cache 604, the session management module 614 may continue to push content to the mid-tier cache 604 until the communication link is closed.

The session management module 614 may be configured to group or associate a plurality of communication links for the same content. If there are three mid-tier caches 604 that are requesting the same content, the session management module 614 may treat the three separate communication links as associated for efficient management of the communication links.

The session management module 614 may have stateful logic for managing the communications links associated with the packaging device 602. The session management module 614 may set the state of a communication link as active in order to send content to the requesting device. The session management module 614 may monitor the communication link to ensure the communication link is still active (e.g., that the requesting device is still desiring to receive and/or consume the content). The session management module 614 may continue to push content to the requesting device as long as the communication link is open and/or active. The communication link may be closed and/or deactivated by the packaging device 602 if there is no content to send to the mid-tier cache 604. The communication link may be closed and/or deactivated by the mid-tier cache 604 because the mid-tier cache 604 no longer needs the content associated with the communication link.

Once the communication link is closed and/or deactivated, the session management module 614 may change the stateful logic associated with the communication link to indicate the communication link is closed. Once the session management module 614 determines the communication link is closed, the session management module 614 determines whether there are any additional communication links requesting the same content associated with the now closed communication link. If there are no other communication links requesting the same content, then the session management module 614 may instructed the cache 612 to remove the content as there is no longer a need for the content because no device is requesting the content. In this manner, the session management module 614 clears the cache 612 of any unnecessary data from any closed and/or deactivated communication links.

The session management module 614 may use one or more tokens (e.g., counters, timers, etc.) when managing the communication links. The session management module 614 may increment a counter associated with each communication link each time a packet is sent via the communication link. Each packet may be 2 seconds in length, and the counter may be incremented each time a packet is sent. Thus, if the counter indicates 30 packets have been sent, the counter may indicate that 60 seconds have passed. The session management module 614 may close and/or deactivate communication links after a period of time. If 60 seconds have passed and the session management module 614 does not receive a communication from the requesting device (e.g., the mid-tier cache 604), the session management module 614 may assume the requesting device is no longer consuming the content and closes and/or deactivates the communication link. In this manner, the session management module 614 may use counters to manage the communication links associated with the packaging device 602.

The session management module 614 may close and/or deactivate communication links without communicating with another device (e.g., the mid-tier cache 604). A counter may be incremented each time a new communication link is added, as well as the counter may be decremented each time a communication link is removed so that the session management module 614 may track the active communication links associated with the packaging device 602.

The session management module 614 may keep track of the number of devices associated with a specific type of content. The session management module 614 may use a counter to keep track of the number of devices that have requested the specific content. That is, three devices (e.g., three mid-tier caches 604) may request the specific content. The session management module 614 may maintain the content in the cache 612 until there are no more devices requesting the specific content. A counter may be used to keep track (e.g., count) the number of devices associated with the specific content.

The session management module 614 may use a token (e.g., a counter, a timer, etc.) to ensure a communication link is active. A counter may be incremented each time the packaging device 602 packages data for transmission. The counter may be decremented when the packaging device 602 sends data to a device (e.g., the mid-tier cache 604). If the counter satisfies a threshold (e.g., reaches 30 counts), the session management module 614 may determine that the communication link with the mid-tier cache 604 is closed since data is not being sent to the mid-tier cache 604 because the counter has not been decremented to indicate data has been sent. In turn, the session management module 614 may close the communication link with the mid-tier cache 604 as well as decrement the counter associated with the communication links managed by the session management module 614. The session management module 614 may determine that the communication link with the mid-tier cache 604 is closed because the mid-tier cache 604 closes a socket associated with the communication link so that the packing device 602 may no longer send data via the communication link. In this manner, the session management module 614 is able to close and/or maintain communications links with other devices without the need for the devices to communicate back and forth by using a counter.

As shown, the mid-tier cache 604 may have a client module 618, a cache 620, a session management module 622, and a server module 624. The mid-tier cache 604 may receive content and store the received content in the cache 620. The server 624 may communicate with another device. The server 624 may communicate with the packaging device 602 and/or the edge cache device 606. The mid-tier cache 604 may receive pushed content from the packaging device 602. The mid-tier cache 604 may also send content to the edge cache 606. The mid-tier cache 604 may push content to the edge cache 606 as the content becomes available. That is, when the mid-tier cache 604 receives pushed content from the packaging device 602, the mid-tier cache 604 may push the content to the edge cache 606.

The cache 620 may store content. The cache 620 may store content received from the packaging device 602, as well as content for distributing to the edge cache 606. The content stored for distributing to the edge cache 606 may be stored with origination information associated with the content (e.g., as described above with respect to FIG. 5) to permit the cache 620 to provide the content in response to requests for the content to be received via a packaging device other than packaging device 602. The cache 620 may also update content stored within the cache 620 based on the received content. The cache 620 may also remove content after the effective life of the content is ended. The cache 620 may remove data based on a Cache-Control time-to-live.

The client module 618 may communicate with another device. The client module 618 may communicate with the packaging device 602. The client module 618 may establish a communication link with the packaging device 602 in order to receive content from the packaging device 602. The client module 618 may request content that is not in the cache 620. The mid-tier cache 604 may receive a request for content (e.g., from the edge cache 606), and may determine that the cache 620 does not have the requested content. Thus, the client module 618 establishes the communication link with the packaging device 602 to request the missing content. Once the mid-tier cache 604 receives the missing content, the client module 618 may push the content to the requesting device (e.g., the edge cache 606).

The server module 624 may be configured to communicate with another device. The server module 624 may communicate with the edge cache 606, as well as send the edge cache 606 content. The server module 624 may be configured to handle communications for the mid-tier cache 604 to the edge cache 606. Specifically, the server module 624 may open and/or create a communication link to communicate with the edge cache 606. The server module 624 waits to receive new attempts to establish a communication link for content from a device (e.g., the edge cache 606). When the server module 624 receives a new attempt to establish a communication link, the server module 624 may verify that the requesting device supports a communication protocol that allows the server module 624 to communicate with the requesting device. The server module 624 may verify that the requesting device supports the HTTP 2.0 protocol. The server module 624 creates or updates information associated with the requesting device and/or the communication link. The server module 624 indicates to the session management module 622 that a new communication link has been established.

The server module 624 may send content to the edge cache 606 via the opened/created communication link. After the communication link is established, the server module 624 sends a plurality of content fragments to the requesting device (e.g., the edge cache 606). The server module 624 may push content fragments to the edge cache 606 without the edge cache 606 requesting content. Stated differently, the server module 624 may push content fragments to the edge cache 606 based on the established communication link without the edge cache 606 requesting content because the server module 624 determines the content the edge cache 606 desires based on the communication link. The server module 624 may push content fragments to the edge cache 606 without the edge cache 606 sending additional requests for content. Stated differently, once the edge cache 606 requests content from the mid-tier cache 604, the server module 624 may push the content fragments to the edge cache 606 without the edge cache 606 needing to request each of the content fragments. The server module 624 continues to push content fragments to the edge cache 606 until the communication link between the mid-tier cache 604 and the edge cache 606 is closed.

The mid-tier cache 604 may have a session management module 622. The session management module 622 manages all established communication links associated with the mid-tier cache 604. The session management module 614 manages the communication links between the mid-tier cache 604 and the packaging device 602, as well as the communication links between the mid-tier cache 604 and the edge cache 606.

After the server module 624 establishes a communication link with the edge cache 606, the server module 624 indicates to the session management module 622 that a communication link has been established so that the session management module 622 may manage the newly established communication link. The session management module 622 may then ensure that the edge cache 606 receives content based on the content requested by the edge cache 606. The session management module 622 may send the requested content, as well as any subsequent content, to the edge cache 606. The session management module 622 may push content to the edge cache 606 as soon as the content is available for distribution to the edge cache 606.

After the client module 618 establishes a communication link with the packaging device 602, the client module 618 indicates to the session management module 622 that a communication link has been established so that the session management module 622 may manage the newly established communication link. The session management module 622 may then ensure that the mid-tier cache 604 receives the content requested from the packing device 602. In this manner, the session management module 622 ensures that the mid-tier cache 604, as well as the edge cache 606, have the most up to date content from the packaging device 602. That is, once the communication link is established between the packaging device 602 and the mid-tier cache 604, the session management module 622 may push the content received from the packaging device 602 to the edge cache 606 until the communication link is closed between the mid-tier cache 604 and the edge cache 606, or until the communication link is closed between the mid-tier cache 604 and the packaging device 602.

The session management module 622 may be configured to group or associate a plurality of communication links for the same content. If there are three edge caches 606 that are requesting the same content, the session management module 622 may treat the three separate communication links as associated for efficient management of the communication links.

The session management module 622 may have stateful logic for managing the communications links associated with the mid-tier cache 604. The session management module 622 may set the state of a communication link as active in order to send content to a device requesting content (e.g., the edge cache 606). The session management module 622 may monitor the communication link to ensure the communication link is still active (e.g., that the requesting device is still desiring to receive and/or consume the content). The session management module 622 may continue to push content to the requesting device as long as the communication link is open and/or active. The communication link may be closed and/or deactivated by the mid-tier cache 604 if there is no content to send to the edge cache 606. The communication link may be closed and/or deactivated by the edge cache 606 because the edge cache 606 no longer needs the content associated with the communication link.

Once the communication link is closed and/or deactivated, the session management module 622 may change the stateful logic associated with the communication link to indicate the communication link is closed. Once the edge cache 606 closes the communication link with the mid-tier cache 604, the session management module 622 may close a communication link with the packaging device 602. Stated differently, when all communication links to downstream devices (e.g., the edge cache 606) are closed, the mid-tier cache 604 may close a communication link with the packaging device 602 because the mid-tier cache 604 no longer needs the content from the packaging device 602 since the edge cache 606 is no longer requesting the content. The mid-tier cache 604 may request content from the packaging device 602 to send to the edge cache 606. Thus, a communication link may be established between the packaging device 602 and the mid-tier cache 604 in order to send content to the edge cache 606. However, once the edge cache 606 indicates that the edge cache 606 no longer needs the content (e.g., closes and/or deactivates the communication link between the edge cache 606 and the mid-tier cache 604), the session management module 622 closes the communication link between the packaging device 602 and the mid-tier cache 604 because the content associated with the aforementioned communication link is no longer needed. In this manner, the session management module 622 may manage multiple associated communication links. The mid-tier cache 604 may close the communication link with the edge cache 606 and/or the packaging device 602 in response to, and/or based on, the client device 608 closing the communication link with the edge cache 606.

Once the session management module 622 determines the communication link is closed, the session management module 622 determines whether there are any additional communication links requesting the same content associated with the now closed communication link. If there are no other communication links (e.g., active communication links) requesting the same content, then the session management module 622 may instruct the cache 620 to remove the content as there is no longer a need for the content because no device is requesting the content. In this manner, the session management module 622 clears the cache 620 of any unnecessary data from any closed and/or deactivated communication links.

The session management module 622 may use one or more tokens (e.g., counters, timers, etc.) when managing the communication links. The session management module 622 may increment a counter associated with each communication link each time a packet is sent via the communication link. Each packet may be 2 seconds in length, and the counter is incremented each time a packet is sent. Thus, if the counter indicates 30 packets have been sent, the counter indicates that 60 seconds have passed. The session management module 622 may close and/or deactivate communication links after a period of time. If 60 seconds have passed, and the session management module 622 does not receive a communication from the requesting device (e.g., the edge cache 606), the session management module 622 may assume the requesting device is no longer consuming the content and closes and/or deactivates the communication link. In this manner, the session management module 622 may use counters to manage the communication links associated with the mid-tier cache 604.

The session management module 622 may close and/or deactivate communication links without communicating with another device (e.g., the packaging device 602, the edge cache 606, etc.). A counter may be incremented each time a new communication link is added, as well as the counter may be decremented each time a communication link is removed so that the session management module 622 may track the active communication links associated with the mid-tier cache 604.

The session management module 622 may keep track of the number of devices associated with a specific type of content. The session management module 622 may use a counter to keep track of the number of client devices that have requested the specific content. That is, three client devices (e.g., edge caches 606) may request the specific content from the mid-tier cache 604. Each of the three edge caches 606 may have a communication link associated with each of the edge caches 606. A counter may be used to keep track of (e.g., count) the number of client devices (e.g., edge caches 606) associated with the specific content. The counter may keep track of (e.g., count) the number of communication links associated with the specific content. When a client device (e.g., one of the edge caches 606) closes a communication link, the counter may be updated to reflect the removal of a client device. The counter may be decremented until the counter satisfies a threshold (e.g., the counter reaches zero to indicate there are no active communication links or client devices associated with the specific content). The counter may be incremented if additional client devices request content from the mid-tier cache 604.

When the counter satisfies the threshold (e.g., the counter reaches zero to indicate there are no active communication links or client devices associated with the specific content), the session management module 622 may close a communication link to a device that the mid-tier cache 604 is receiving content from. The session management module 622 may close a communication link associated with the packaging device 602 that sent the content to the mid-tier cache 604 for distribution to the client devices (e.g., the three edge caches 606). The session management module 622 may close a communication link associated with the packaging device 602 based on the counter satisfying a threshold (e.g., the counter reaches zero). That is, when there are no longer any client devices associated with a specific content, the session management module 622 may close a communication link to a device that is supplying the specific content to the mid-tier cache 604 because the mid-tier cache 604 no longer needs the specific content. In this manner, the session management module 622 may close communication links with an upstream device (e.g., the packaging device 602) based on the mid-tier cache 604 having no client devices (e.g., the edge cache 606) that are requesting the content that the upstream device was sending to the mid-tier cache 604. Similarly, the session management module 622 may close communication links with downstream devices (e.g., the edge cache 606), if the communication link with the upstream device (e.g., the packaging device 602) is terminated or rendered inactive. In this manner, the session management module 622 allows the mid-tier cache 604 to dynamically control communication sessions associated with the mid-tier cache 604.

The session management module 622 may use a token (e.g., a counter, a timer, etc.) to ensure a communication link is active. A counter may be incremented each time the mid-tier cache 604 receives data (e.g., from the packaging device 602). The counter may be decremented when the mid-tier cache 604 sends data to a device (e.g., the edge cache 606). If the counter satisfies a threshold (e.g., reaches 30 counts), the session management module 622 may determine that the communication link with the edge cache 606 is closed since data is not being sent to the edge cache 606 because the counter has not been decremented to indicate data has been sent. In turn, the session management module 622 may close the communication link with the edge cache 606 as well as decrement the counter associated with the communication links managed by the session management module 622. The session management module 622 may determine that the communication link with the edge cache 606 is closed because the edge cache 606 closes a socket associated with the communication link so that the mid-tier cache 604 may no longer send data via the communication link. In this manner, the session management 622 is able to close and/or maintain communications links with other devices without the need for the devices to communicate back and forth by using a counter.

As shown, the edge cache 606 may have a client 626, a cache 628, a session management 630, and a server 632. The edge cache 606 may receive content and store the received content in the cache 628. The cache 628 may store content. The cache 628 may store content received from the mid-tier cache 604, as well as content for distributing to the client device 608. The cache 628 may also update content stored within the cache 628 based on the received content. The cache 628 may also remove content after the effective life of the content is ended. The cache 628 may remove data based on a Cache-Control time-to-live.

The client module 626 may communicate with another device. The client module 626 communicates with the mid-tier cache 604. The client module 626 establishes a communication link with the mid-tier cache 604 in order to receive content from the mid-tier cache 604. The client module 626 may request content that is not in the cache 628. The edge cache 606 may receive a request for content (e.g., from the client device 608), and may determine that the cache 628 does not have the requested content. Thus, the client module 626 establishes the communication link with the mid-tier cache 604 to request the missing content. Once the edge cache 606 receives the missing content, the client module 626 may push the content to the requesting device (e.g., the client device 608).

The server module 632 may be configured to communicate with another device. The server module 632 may communicate with the client device 608, as well as provide the client device 608 with content. The server module 632 may be configured to handle communications for the edge cache 606 to the client device 608. Specifically, the server module 632 may open and/or create a communication link to communicate with the client device 608. The server module 632 waits to receive new attempts to establish a communication link for content from a device (e.g., the client device 608). When the server module 632 receives a new attempt to establish a communication link, the server module 632 may verify that the requesting device supports a communication protocol that allows the server module 632 to communicate with the requesting device. The server module 632 may verify that the requesting device supports the HTTP 2.0 protocol. The server module 632 creates or updates information associated with the requesting device and/or the communication link. The server module 632 indicates to the session management module 630 that a new communication link has been established.

The server module 632 may send content to client device 608 via the opened/created communication link. After the communication link is established, the server module 632 sends a plurality of content fragments to the requesting device (e.g., the client device 608). The server module 632 may push content fragments to the client device 608 without the client device 608 requesting content. Stated differently, the server module 632 may push content fragments to the client device 608 based on the established communication link without the client device 608 requesting content because the server module 632 determines the content the client device 608 desires based on the communication link. The server module 632 may push content fragments to the client device 608 without the client device 608 sending additional requests for content. Stated differently, once the client device requests content from the edge cache 606, the server module 632 may push the content fragments to the client device 608 without the client device 608 needing to request each of the content fragments. The server module 632 continues to push content fragments to the client device 608 until the communication link between the edge cache 606 and the client device 608 is closed.

The edge cache 606 may have a session management module 630. The session management module 630 manages all established communication links associated with the edge cache 606. The session management module 630 manages the communication links between the edge cache 606 and the mid-tier cache 604, as well as the communication links between the edge cache 606 and the client device 608.

After the server module 630 establishes a communication link with the client device 608, the server module 632 indicates to the session management module 630 that a communication link has been established so that the session management module 630 may manage the newly established communication link. The session management module 630 may then ensure that the client device 608 receives content based on the content requested by the client device 608. The session management module 630 may send the requested content, as well as any subsequent content, to the client device 608. The session management module 630 may push content to the client device 608 as soon as the content is available for distribution to the client device 608.

After the client module 626 establishes a communication link with the mid-tier cache 604, the client module 626 indicates to the session management module 630 that a communication link has been established so that the session management module 630 may manage the newly established communication link. The session management module 630 may then ensure that the edge cache 606 receives the content requested from the mid-tier cache 604. In this manner, the session management module 630 ensures that the edge cache

606, as well as the client device 608, have the most up to date content from the mid-tier cache 604. That is, once the communication link is established between the edge cache 606 and the mid-tier cache 604, the session management module 630 may push the content received from the mid-tier cache to the client device 608 until the communication link is closed between the edge cache 606 and the client device 608, or until the communication link is closed between the edge cache 606 and the mid-tier cache 604.

The session management module 630 may be configured to group or associate a plurality of communication links for the same content. If there are three client device 608 that are requesting the same content, the session management module 630 may treat the three separate communication links as associated for efficient management of the communication links.

The session management module 630 may have stateful logic for managing the communications links associated with the edge cache 606. The session management module 630 may set the state of a communication link as active in order to provide content to a device requesting content (e.g., the client device 608). The session management module 630 may monitor the communication link to ensure the communication link is still active (e.g., that the requesting device is still desiring to receive and/or consume the content). The session management module 630 may continue to push content to the requesting device as long as the communication link is open and/or active. The communication link may be closed and/or deactivated by the edge cache 606 if there is no content to send to the client device 608. The communication link may be closed and/or deactivated by the client device 608 because the client device 608 no longer needs the content associated with the communication link.

Once the communication link is closed and/or deactivated, the session management module 630 may change the stateful logic associated with the communication link to indicate the communication link is closed. Once the client device 608 closes the communication link with the edge cache 606, the session management module 630 may close a communication link with the mid-tier cache 604. Stated differently, when all communication links to downstream devices (e.g., the client device 608) are closed, the edge cache 606 may close a communication link with the mid-tier cache 604 because the edge cache 606 no longer needs the content from the mid-tier cache 604. The edge cache 606 may request content from the mid-tier cache 604 to send to the client device 608. Thus, a communication link may be established between the edge cache 606 and the mid-tier cache 604 in order to send content to the client device 608. However, once the client device 608 indicates that the client device 608 no longer needs the content (e.g., closes and/or deactivates the communication link between the client device 608 and the edge cache 606), the session management module 630 closes the communication link between the edge cache 606 and the mid-tier cache 604 because the content associated with the aforementioned communication link is no longer needed. The edge cache 606 may close the communication link with the mid-tier cache 604 in response to, and/or based on, the client device 608 closing the communication link with the edge cache 606. In this manner, the session management module 630 may manage multiple associated communication links.

Once the session management module 630 determines the communication link is closed, the session management module 630 determines whether there are any additional communication links requesting the same content associated with the now closed communication link. If there are no other communication links requesting the same content, then the session management module 630 may instruct the cache 628 to remove the content as there is no longer a need for the content because no device is requesting the content. In this manner, the session management module 630 clears the cache 628 of any unnecessary data from any closed and/or deactivated communication links.

The session management module 630 may use one or more tokens (e.g., counters, timers, etc.) when managing the communication links. The session management module 630 may increment a counter associated with each communication link each time a packet is sent via the communication link. Each packet may be 2 seconds in length, and the counter is incremented each time a packet is sent. Thus, if the counter indicates 30 packets have been sent, the counter indicates that 60 seconds have passed. The session management module 630 may close and/or deactivate communication links after a period of time. If 60 seconds have passed, and the session management module 630 does not receive a communication from the requesting device (e.g., the client device 608), the session management module 630 may assume that the requesting device is no longer consuming the content and closes and/or deactivates the communication link. In this manner, the session management module 630 may use counters to manage the communication links associated with the edge cache 606.

The session management module 630 may close and/or deactivate communication links without communicating with another device (e.g., the mid-tier cache 604, the client device 608, etc.). A counter may be incremented each time a new communication link is added, as well as the counter may be decremented each time a communication link is removed so that the session management module 630 may track the active communication links associated with the edge cache 606.

The session management module 630 may keep track of the number of devices associated with a specific type of content. The session management module 630 may use a counter to keep track of the number of client devices that have requested the specific content. That is, three client devices (e.g., client devices 608) may request the specific content from the edge cache 606. Each of the three client devices 608 may have a communication link associated with each of the client devices 608. A counter may be used to keep track of (e.g., count) the number of client devices (e.g., client device 608) associated with the specific content. The counter may keep track of (e.g., count) the number of communication links associated with the specific content. When a client device (e.g., one of the client devices 608) closes a communication link, the counter may be updated to reflect the removal of a client device. The counter may be decremented until the counter satisfies a threshold (e.g., the counter reaches zero to indicate there are no active communication links or client devices associated with the specific content). The counter may be incremented if additional client devices request content from the edge cache 606.

When the counter satisfies the threshold (e.g., the counter reaches zero to indicate there are no active communication links or client devices associated with the specific content), the session management module 630 may close a communication link to a device that the mid-tier cache 604 is receiving content from. The session management module 630 may close a communication link associated with the packaging device 602 that sent the content to the mid-tier cache 604 for distribution to the client devices (e.g., the three edge caches 606). The session management module 630 may close a communication link associated with the packaging device 602 based on the counter satisfying a threshold (e.g., the counter reaches zero). That is, when there are no longer any client devices associated with a specific content, the session management module 630 may close a communication link to a device that is supplying the specific content to the mid-tier cache 604 because the mid-tier cache 604 no longer needs the specific content. In this manner, the session management module 630 may close communication links with an upstream device (e.g., the packaging device 602) based on the mid-tier cache 604 having no client devices (e.g., the edge cache 606) that are requesting the content that the upstream device was sending to the mid-tier cache 604. Similarly, the session management module 630 may close communication links with downstream devices (e.g., the client device 608), if the communication link with the upstream device (e.g., the mid-tier cache 604) is terminated or rendered inactive. In this manner, the session management module 630 allows the edge cache 606 to dynamically control communication sessions associated with the edger cache 606.

The session management module 630 may use a token (e.g., a counter, a timer, etc.) to ensure a communication link is active. A counter may be incremented each time the edge cache 606 receives data (e.g., from the mid-tier cache 604). The counter may be decremented when the edge cache 606 sends data to a device (e.g., the client device 608). If the counter satisfies a threshold (e.g., reaches 30 counts), the session management module 630 may determine that the communication link with the client device 608 is closed since data is not being sent to the client device 608 because the counter has not been decremented to indicate data has been sent. In turn, the session management module 630 may close the communication link with the client device 608 as well as decrement the counter associated with the communication links managed by the session management module 630. The session management module 630 may determine that the communication link with the client device 608 is closed because the client device 608 closes a socket associated with the communication link so that the edge cache 606 may no longer send data via the communication link. In this manner, the session management 630 is able to close and/or maintain communications links with other devices without the need for the devices to communicate back and forth by using a counter.

As shown, the client device 608 may have a client 634, a cache 636, and a session management 638. The cache 636 may store content. The cache 636 may store content received from the edge cache 606. The cache 636 may also update content stored within the cache 636 based on the received content. The cache 636 may also remove content after the effective life of the content is ended. The cache 636 may remove data based on a Cache-Control time-to-live.

The client module 634 may communicate with another device. The client module 634 communicates with the edge cache 606. The client module 634 establishes a communication link with the edge cache 606 in order to receive content from the edge cache 606. The client module 634 may request content that is not in the cache 636. The client device 608 may receive a request for content (e.g., from a user of the client device), and may determine that the cache 636 does not have the requested content. Thus, the client module 634 establishes the communication link with the edge cache 606 to request the missing content. After requesting the content from the edge cache 606, the edge cache 606 may in turn create a communication link with the mid-tier cache 604. Thus, the client device 608 requesting content may result in the edge cache 606 requesting content to fulfill the request. Stated differently, a downstream device (e.g., the client device 608) may cause an upstream device (e.g., the edge cache 606, the mid-tier cache 604, and/or the packaging device 602) to create one or more communication links to facilitate completion of the request. Once the client device 608 receives the missing content, the client module 634 may display the content (e.g., on a display device).

The client device 608 may have a session management module 638. The session management module 638 manages all established communication links associated with the client device 608. The session management module 638 manages the communication links between the client device 608 and the edge cache 606. The session management module 638 manage the communication links between the client device 608 and a plurality of edge caches 606.

After the client module 634 establishes a communication link with the edge cache 606, the client module 634 indicates to the session management module 638 that a communication link has been established so that the session management module 638 may manage the newly established communication link. The session management module 638 may then ensure that the client device 608 receives the content requested from the edge cache 606. In this manner, the session management module 638 ensures that the client device 608 has the most up to date content from the edge cache 606. That is, once the communication link is established between the edge cache 606 and the client device 608, the session management module 638 may ensure the requested content is received from the edge cache 606 until the communication link is closed between the edge cache 606 and the client device 608. The communication link may be closed by the edge cache 606. The communication link may be closed by the client device 608 (e.g., upon termination of a rendering of the content by the client device 608).

The session management module 638 may have stateful logic for managing the communications links associated with the client device 608. The session management module 638 may set the state of a communication link as active in order to receive content. The session management module 638 may monitor the communication link to ensure the communication link is still active. The communication link may be closed and/or deactivated by the client device 608 because the client device 608 no longer needs the content associated with the communication link. A user of the client device 608 may indicate to the client device 608 that the user no longer wishes to consume the content. Thus, the client device 608 closes and/or deactivates the communication link between the client device 608 and the edge cache 606.

Once the session management module 638 determines the communication link is closed, the session management module 638 may instruct the cache 636 to remove the content as there is no longer a need for the content. In this manner, the session management module 638 clears the cache 636 of any unnecessary data from any closed and/or deactivated communication links.

The client device 608 may not have the session management 638. The client device 608 may not support HTTP 2.0, which may allow the device 608 to use the session management 638. Rather, the client device 608 may use a legacy protocol. When the client device has a legacy protocol, the session management 638 is bypassed and a request/response model is used for the client device 608. In this manner, the system 600 may be configured to communicate with devices that have a legacy protocol, as well as devices that implement session management.

While FIG. 6 is described with only one packaging device 602, one mid-tier cache 604, one edge cache 606, and one client device 608 for ease of explanation, a person skilled in the art would appreciate there could a plurality of each of the devices. Also, while a single communication link is shown between each of the packaging device 602, the mid-tier cache 604, the edge cache 606, and the client device 608 for ease of explanation, a person skilled in the art would appreciate there may be multiple communication links between the devices, such as a communication link for a manifest, another communication link for video content, a third communication link for audio content, and so forth. Further, while FIG. 6 shows each device (e.g., the packaging device 602, the mid-tier cache 604, the edge cache 606, and the client device 608) as having a session management module for ease of explanation, a person skilled in the art would appreciate that the devices do not have to have a session management module, and it is contemplated that all, some, and/or none of the devices of FIG. 6 have to have a session management module.

Figure 7:
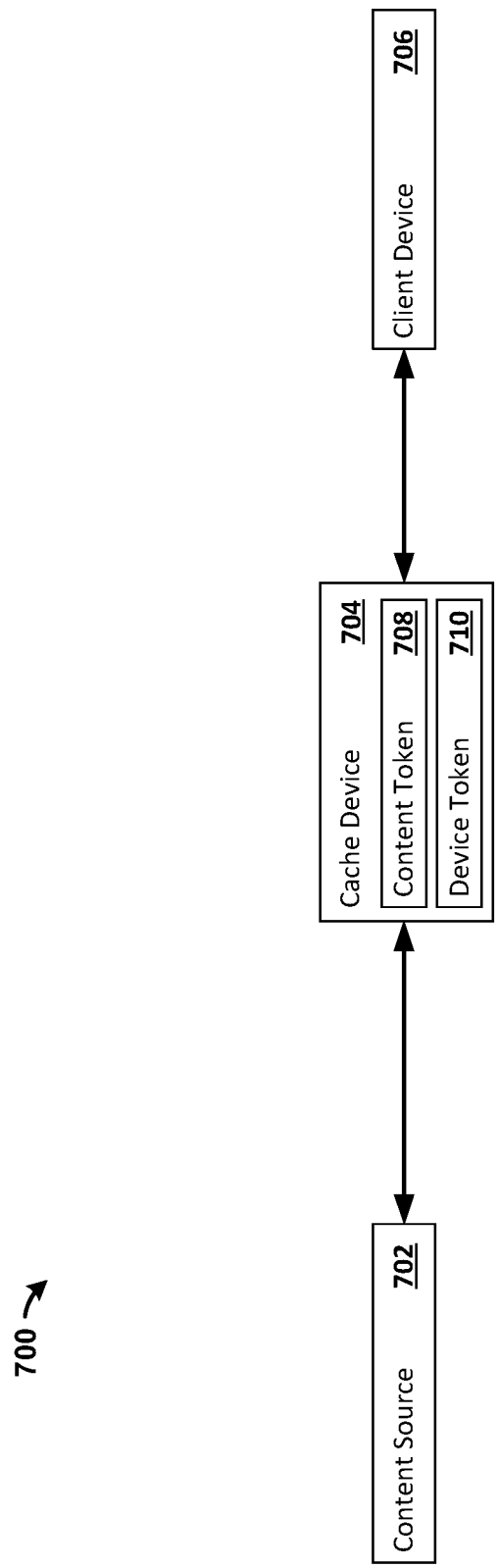
FIG. 7 shows a system for delivering content.

FIG. 7 shows a system 700. The system 700 may have a content source 702 (e.g., the central location 101 and/or the content source 127 of FIG. 1; the content source 202 of FIG. 2; and/or the content sources 302, 304 of FIG. 3; the packaging device 602 and/or the mid-tier cache 604 of FIG. 6), a cache device 704 (e.g., the edge device 128 of FIG. 1; the mid-tier cache 604 and/or the edge cache 606 of FIG. 6), and a client device 706 (e.g., the media device 120, the communication terminal 122, and/or the mobile device 124 of FIG. 1; the mid-tier cache 604, the edge cache 606, and/or the client device 606 of FIG. 6). Though not shown in FIG. 7, the system 700 may utilize a VQ agent as discussed above with respect to FIGS. 2-5. Specifically, the content source 702 may send content to another device based on an instruction received from a VQ agent (e.g., the VQ agent may determine that a portion of content prepared for delivery by the content source 702 is of a higher quality than the portion prepared for delivery by another content source in communication with the VQ agent). The content source 702 may send content to the cache device 704 via a communication link. The cache device 704 may send the received content to the client device 706.

The content may be received and/or sent in packets. The cache device 704 may monitor the received content (e.g., the received packets) and/or the sent content (e.g., the sent packets) using a content token 708. That is, the content token 708 may indicate a status associated with the content. The content token 708 may be a counter, a timer, or other token for indicating the received content. The content token 708 may be updated (e.g., incremented, decremented, reset, etc.). The content token 708 may increment and/or decrement based on the received content. The content token 708 may increment and/or decrement based on each packet of the received content. The content token 708 may increment and/or decrement based on the sent content. The content token 708 may increment and/or decrement based on each packet of the sent content. The content token 708 may be reset (e.g., to a default value) based on the received and/or sent content. The content token 708 may be decremented and/or reset based on the packets received by the cache device 704 (e.g., from the content source 702), and the content token 708 may be incremented based on the packets sent by the cache device 704 (e.g., to the client device 706).

The content token 708 may have a state associated with the content token 708. The state of the content token 708 may indicate the current state of the content token 708 (e.g., a value of a counter, a current time of a timer, etc.). The state of the content token 708 may be updated (e.g., incremented, decremented, reset, etc.) to reflect changes associated with the content token 708.

The cache device 704 may take an action based on the content token 708 satisfying a threshold. The cache device 704 may terminate the communication link (e.g., close a socket associated with the communication link) with the client device 706 based on the content token 708 satisfying the threshold. The threshold may be a value associated with a counter (e.g., 1, 15, 70, 100, etc.), a time period associated with a timer (e.g., 1 ms, 5 ms, 1 second, 1 minute, etc.), or any threshold that may be associated with the content token 708. The threshold may indicate a problem (e.g., a failure, termination of, etc.) of the communication link with the content source 702. The cache device 704 may terminate the communication link with the client device 706 based on the content token 708 satisfying the threshold because the content token 708 indicates that the cache device 704 may no longer be receiving content from the content source 702. Thus, the cache device 704 may manage communication links between the content source 702 and the client device 706 by utilizing the content token 708.

The cache device 704 may have a device token 710. The device token 710 may be a counter, a timer, or other token for indicating devices associated with the cache device 704. The device token 710 may indicate client devices (e.g., the client device 706) receiving content from the cache device 704. The device token 710 may increment and/or decrement based on a client device (e.g., the client device 706) establishing or terminating a communication link with the cache device 704. The client device 706 may request content from the cache device 704, and a communication link may be established between the cache device 704 and the client device 706. The device token 710 may be incremented to indicate an increase in the number of devices receiving content from the cache device 704. The client device 706 may terminate (e.g., close a socket associated with) the communication link with the cache device 704. The device token 710 may be decremented to indicate a decrease in the number of devices receiving content from the cache device 704.

The device token 710 may have a state associated with the device token 710. The state of the device token 710 may indicate the current state of the device token 710 (e.g., a value of a counter, a current time of a timer, etc.). The state of the device token 710 may be updated (e.g., incremented, decremented, reset, etc.) to reflect changes associated with the device token 710.

The cache device 704 may take an action based on the device token 710 satisfying a threshold. The cache device 704 may terminate the communication link (e.g., close a socket associated with the communication link) with the content source 702 based on the device token 710 satisfying the threshold. The threshold may be a value associated with a counter (e.g., 1, 15, 70, 100, etc.), a time period associated with a timer (e.g., 1 ms, 5 ms, 1 second, 1 minute, etc.), or any threshold that may be associated with the device token 710. The threshold may indicate that the cache device 704 no longer needs content from the content source 702. The device token 710 may be decremented based on the client device 706 terminating the communication link, and the device token 710 may satisfy a threshold that indicates that there are no client devices 706 receiving content from the cache device 704. The cache device 704 may terminate (e.g., close a socket associated with) the communication link with the content source 702 because the cache device 704 no longer needs content from the content source 704 since there are no client devices 706 receiving content form the cache device 704. Thus, the cache device 704 may manage communication links between the content source 702 and the client device 706 by utilizing the device token 710.

While a single content source 702, a single cache device 704, and a single client device 706 are used for ease of explanation, a person skilled in the art would appreciate that the system 700 may have any number of content sources 702, cache devices 704, and client devices 706.

FIG. 8A shows a system 800. The system 800 may have a content source 802 (e.g., the central location 101 and/or the content source 127 of FIG. 1; the packaging device 602 and/or the mid-tier cache 604 of FIG. 6; and/or the content source 702 of FIG. 7), a cache device 804 (e.g., the edge device 128 of FIG. 1; the mid-tier cache 604 and/or the edge cache 606 of FIG. 6; and/or the cache device 704 of FIG. 7), and client devices 806a, 806b, and 806c (e.g., the media device 120, the communication terminal 122, and/or the mobile device 124 of FIG. 1; the mid-tier cache 604, the edge cache 606, and/or the client device 606 of FIG. 6; and/or the client device 706 of FIG. 7). Though not shown in FIG. 8A, the system 800 may utilize a VQ agent as discussed above with respect to FIGS. 2-5. Specifically, the content source 802 may send content to another device based on an instruction received from a VQ agent (e.g., the VQ agent may determine that a portion of content prepared for delivery by the content source 802 is of a higher quality than the portion of content prepared for delivery by another content source in communication with the VQ agent). The content source 802 may send content to the cache device 804 via one or more communication links (e.g., the communication links 812a and 812b). The cache device 804 may receive the content, and send the received content to the client devices 806a, 806b, and 806c via one or more communication links (e.g., the communication links 812c, 812c, and 812d).

The client devices 806a, 806b, and 806c may request content from the cache device 804. The client devices 806a and 806b may request a first content, and the client device 806c may request a second content. The first content and the second content may be the same, or different, content. The cache device 804 may request content from the content source 802 based on the requests from the client devices 806a, 806b, and 806c. The cache 804 may request the first content and the second content from the content source 802.

The content source 802 may send the requested content to the cache device 804. The content source 802 may send the requested content on two separate communication links (e.g., the communication links 812a, 812b). The content source 802 may send the first content on the communication link 812a, and the content source 802 may send the second content on the communication link 812b. The cache device 804 may receive the content items from the content source 802 via the communication links 812a and 812b, and send the content items to the client devices 806a, 806b, and 806c via the communication links 812c, 812d, and 812e. The cache device 804 may send the first content to the client devices 806a and 806b via the communication links 812c and 812d, and may send the second content to the client device 806c via the communication link 812e.

The cache device 804 may have content tokens 808a and 808b. The content tokens 808a and 808b may be associated with specific content, as well as specific communication links. The content token 808a may be associated with the first content. The content token 808a may be associated with the communication links 812a (e.g., the communication link 812 that the cache device 804 receives the first content) and the communication links 812c and 812d (e.g., the communication links 812 that that the cache device sends the first content). The content token 808a may increment when a packet of content (e.g., a packet of the first content from the content source 802 via the communication link 812a) is sent to a client device 806 (e.g., the client devices 806a, 806b via the communication links 812c, 812d). The content token 808a may decrement and/or reset to a default value (e.g., 0) when a packet is received from the content source 802.

The content token 808b may be associated with the second content. The content token 808b may be associated with the communication links 812b (e.g., the communication link 812 that the cache device 804 receives the second content) and the communication link 812e (e.g., the communication link 812 that that the cache device sends the second content). The content token 808b may increment when a packet of content (e.g., a packet of the second content from the content source 802 via the communication link 812b) is sent to a client device 806 (e.g., the client device 806c via the communication link 812e). The content token 808b may decrement and/or reset to a default value (e.g., 0) when a packet is received from the content source 802.

The cache device 804 may have device tokens 810a and 810b. The device tokens 810a and 810b may be a counter, a timer, or other token for indicating devices associated with the cache device 704. The device tokens 810a and 810b may indicate client devices (e.g., the client devices 806a, 806b, 806c) receiving content from the cache device 804. The device tokens 810a and 810b may increment and/or decrement based on a client device 806 establishing or terminating a communication link with the cache device 804. The device tokens 810a and 810b may be associated with specific content and/or specific communication links. The device tokens 810a and 810b may indicate the client devices 806 associated with the specific content and/or the specific communication links. The device token 810a, similar to the content token 808a, may be associated with the first content and the client devices 806a and 806b. The device token 810a may indicate that there are two client devices (e.g., the client devices 806a and 806b) receiving the first content from the cache device 804. The device token 810b, similar to the content token 808b, may be associated with the second content and the client device 806c. The device token 810b may indicate that there is one client device (e.g., the client device 806c) receiving the second content from the cache device 804.

FIG. 8B shows a system 850. The system 850 may have a content source 802 (e.g., the central location 101 and/or the content source 127 of FIG. 1; the packaging device 602 and/or the mid-tier cache 604 of FIG. 6; and/or the content source 702 of FIG. 7), a cache device 804 (e.g., the edge device 128 of FIG. 1; the mid-tier cache 604 and/or the edge cache 606 of FIG. 6; and/or the cache device 704 of FIG. 7), and client devices 806a, 806b, and 806c (e.g., the media device 120, the communication terminal 122, and/or the mobile device 124 of FIG. 1; the mid-tier cache 604, the edge cache 606, and/or the client device 606 of FIG. 6; and/or the client device 706 of FIG. 7). The system 850 is similar to the system 800 of FIG. 8A, but the communication links 812c and 812d associated the client devices 806a and 806b, respectively, are terminated and/or closed. Though not shown in FIG. 8B, the system 850 may utilize a VQ agent as discussed above with respect to FIGS. 2-5. Specifically, the content source 802 may send content to another device based on an instruction received from a VQ agent (e.g., the VQ agent may determine that a portion of content prepared for delivery by the content source 802 is of a higher quality than the portion of content prepared for delivery by another content source in communication with the VQ agent).

The cache device 804 may take an action based on the device tokens 810a and/or 810b satisfying a threshold. The cache device 804 may terminate a communication link (e.g., close a socket associated with the communication link) with the content source 802 based on the device tokens 810a and/or 810b satisfying the threshold. The threshold may indicate that the cache device 804 no longer needs content from the content source 804.

The client devices 806a and 806b may terminate and/or close the communication links 812c and 812d. Thus, the client devices 806a and 806b are no longer receiving content from the cache device 804. The device token 810a may be decremented to indicate that the cache device 804 is no longer sending content to the client devices 806a and 806b. The device token 810a may satisfy a threshold after decrementing to indicate that the cache device 804 is no longer sending content to the client devices 806a and 806b. The cache device 804, based on the device token 810a satisfying the threshold, may terminate and/or close the communication link associated with the content being sent to the client devices 806a and 806b (e.g., close and/or terminate the communication link 812a) because the cache device 804 no longer needs the content associated with the communication link 812a as there are no client devices requesting the content associated with the communication link 812a as indicated by the device token 810a. However, the cache device 804 may allow the communication links 812b and 812e to remain active and/or open because the device token 810b indicates there is a client device (e.g., the client device 806c) still requesting content. Thus, the cache device 804 may determine which communication links 812 are terminated and/or closed based on the device tokens 810a and 810b.

Figure 9:
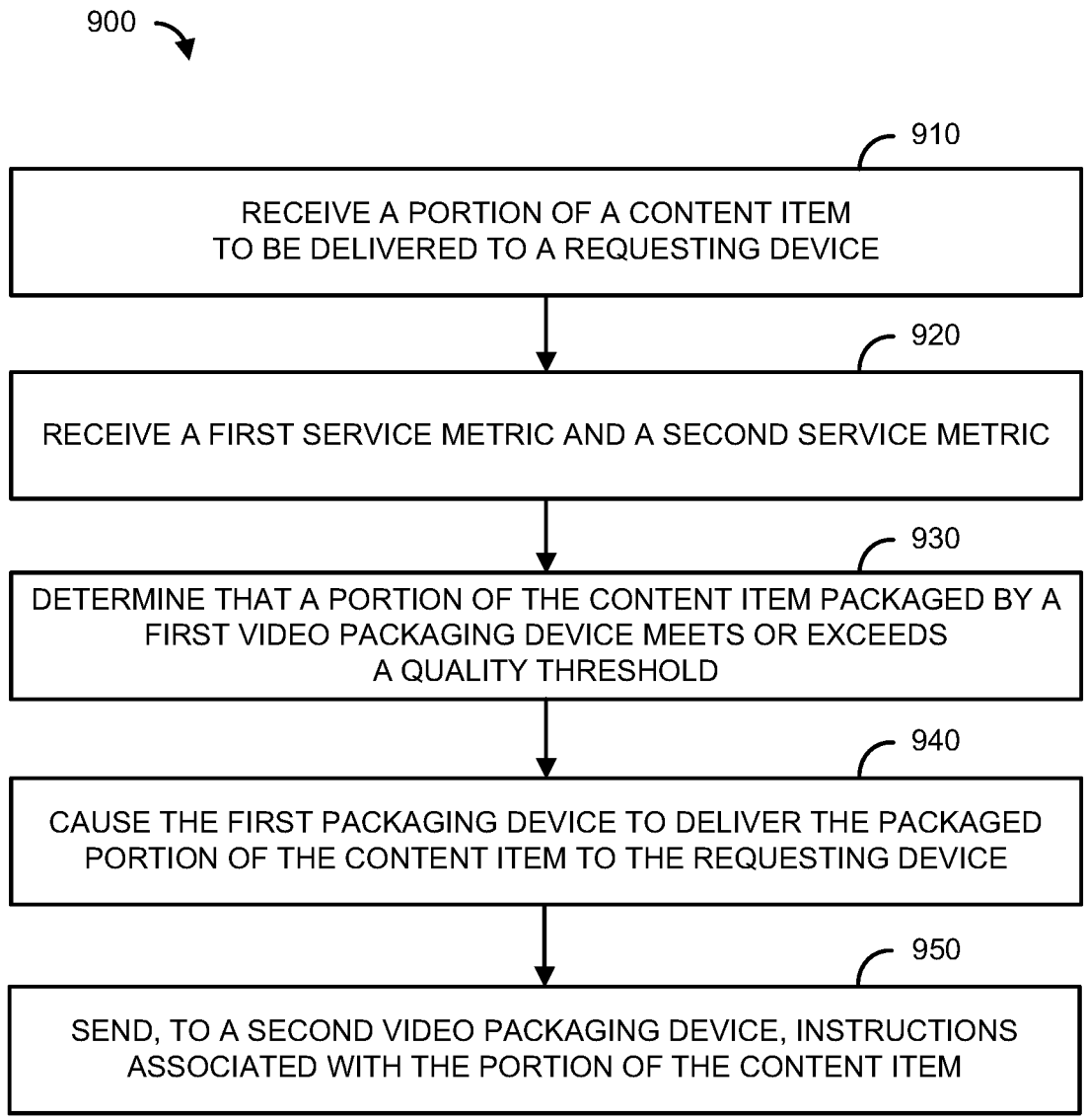
FIG. 9 shows a flowchart of a method for delivering content.

FIG. 9 is a flowchart of a method 900 for distributing content in accordance with the present description. Method 900 may be implemented using the system 100 of FIG. 1, the system 200 of FIG. 2, the system 300 of FIG. 3, the communication flows of FIGS. 4 and 6; the system 600 of FIG. 6; the system 700 of FIG. 7 and/or the system 800 or the system 850 of FIG. 8. At step 910, a portion of a content item to be delivered to a requesting device may be received at a first packaging device and at a second packaging device. The portion of the content item may be a number of frames of video content, a duration of audio content, a number of data packets of video content and/or audio content, and the like. The requesting device may be a set-top box, a digital streaming device, a gaming device, a media storage device, a digital recording device, a computing device, a mobile computing device (e.g., a laptop, a smartphone, a tablet, etc.), a combination thereof, and/or the like. Each of the first packaging device and the second packaging device may be a combiner, such as combiner 117 of FIG. 1, and/or a packaging device, such as any of the packaging devices shown in FIGS. 2, 4, 5, and 6, and the like. The first packaging device may be part of a first network (e.g., a datacenter, central location, etc.) and the second packaging device may be part of a second network (e.g., a datacenter, central location, etc.). The portion of the content item received by the first packaging device and the second packaging device may originate from a first source, such as any of input sources 102a, 102b, or 102c; content source 202, content source 302, content source 304, content source 702, content source 802, and the like. The first packaging device and the second packaging device may each receive the portion of the content item from the first source.

At step 920, a first service metric associated with the first packaging device and a second service metric associated with the second packaging device may each be received (e.g., separately or collectively as one message). The first service metric may be received from a first video quality agent associated with the first network. The second service metric may be received from a second video quality agent associated with the second network. At step 930, a portion of the content item packaged by the first packaging device may be determined to satisfy a quality threshold. The determination at step 930 may be based on the first service metric and the second service metric (e.g., the first service metric may be indicative of a higher quality than the second service metric). The first service metric may be based on one or more packaging errors (e.g., a loss of a packet identifier, an encoder boundary point misalignment, a loss of an audio packet identifier associated with a portion of the content item packaged by the first packaging device, a change in metadata associated with the content item, or any other aspect of packaging the content item that may be observable by the first packaging device). The second service metric may be based on one or more packaging errors (e.g., a loss of a packet identifier, an encoder boundary point misalignment, a loss of an audio packet identifier with a portion of the content item packaged by the second packaging device, a change in metadata associated with the content item, or any other aspect of packaging the content item that may be observable by the second packaging device).

At step 940, the first packaging device may deliver the packaged portion of the content item to the requesting device. The first packaging device may deliver the packaged portion of the content item to the requesting device based on the packaged portion of the content item satisfying the quality threshold. At step 950, a disable message (e.g., an instruction) associated with the portion of the content item may be sent to the second packaging device. The disable message may be sent based on a determination that a portion of the content item packaged by the second packaging device does not satisfy the quality threshold. The disable message may be sent based on a determination that the portion of the content item packaged by the second packaging device satisfies the quality threshold to a lesser degree than the portion of the content item packaged by the first packaging device (e.g., the portion packaged by the first packaging device is determined to be of a higher quality as compared to the portion packaged by the second packaging device). The disable message may be sent based on a determination that the first service metric is associated with a higher quality of packaged content as compared to the second service metric. The disable message may cause the second packaging device to disable delivery of the portion of the content item packaged by the second packaging device to the requesting device.

A second portion of the content item may be received from the first source at the first packaging device and at the second packaging device. The second portion of the content item may be packaged at the first packaging device and at the second packaging device. A request for the second portion of the content item to be delivered from a second source may be received from a second requesting device. The second source may be a content source such as any of input sources 102a, 102b, or 102c; content source 202, content source 302, content source 304, content source 702, content source 802, and the like. The second requesting device may be a set-top box, a digital streaming device, a gaming device, a media storage device, a digital recording device, a computing device, a mobile computing device (e.g., a laptop, a smartphone, a tablet, etc.), a combination thereof, and/or the like. A determination may be made that the second portion of the content item received from the first source and packaged by the second packaging device satisfies the quality threshold. The determination may be based on a third service metric associated with the second packaging device and the second portion of the content item received from the first source and packaged by the second packaging device. Based on the determination that the second portion of the content item packaged by the second packaging device satisfies the quality threshold, the second packaging device may deliver the second portion of the content item received from the first source to the second requesting device (e.g., despite the request from the second requesting device indicating that the second portion of the content item was to be delivered by the second content source).

Figure 10:
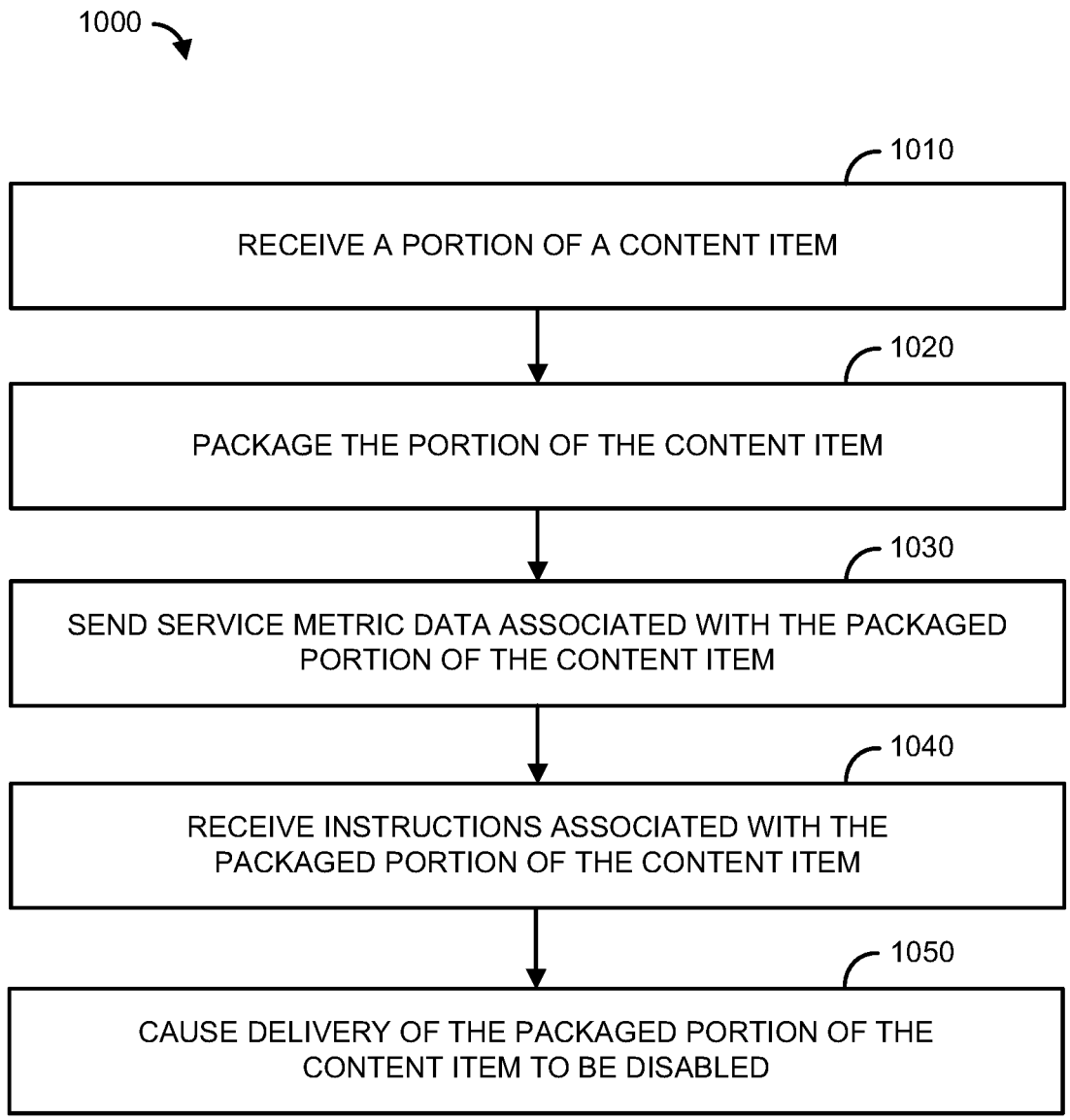
FIG. 10 shows a flowchart of a method for delivering content.

FIG. 10 is a flowchart of a method 1000 for distributing content in accordance with the present description. Method 1000 may be implemented using the system 100 of FIG. 1, the system 200 of FIG. 2, the system 300 of FIG. 3, the communication flows of FIGS. 4 and 6; the system 600 of FIG. 6; the system 700 of FIG. 7 and/or the system 800 or the system 850 of FIG. 8. At step 1010, a portion of a content item to be delivered to a requesting device may be received by a computing device. The portion of the content item may be a number of frames of video content, a duration of audio content, a number of data packets of video content and/or audio content, and the like. The requesting device may be a set-top box, a digital streaming device, a gaming device, a media storage device, a digital recording device, a computing device, a mobile computing device (e.g., a laptop, a smartphone, a tablet, etc.), a combination thereof, and/or the like. The computing device may be a packaging device on a first network (e.g., a datacenter, central location, etc.). The computing device may receive the portion of the content item from a first source, such as any of input sources 102a, 102b, or 102c; content source 202, content source 302, content source 304, content source 702, content source 802, and the like. At step 1020, the computing device may package the portion of the content item. The computing device may package the portion of the content item based on the requesting device (e.g., a suitable format(s) compatible with the requesting device).

At step 1030, indicia of a service metric associated with the packaged portion of the content item may be sent (e.g., by the computing device) to a video quality agent. The indicia of the service metric may indicate one or more packaging errors (e.g., a loss of a packet identifier, an indication of an encoder boundary point misalignment, an indication of a loss of an audio packet identifier associated with the portion of the content item packaged by the computing device, a change in metadata associated with the content item, or any other aspect of packaging the content item that may be observable by the computing device).

At step 1040, a disable message (e.g., an instruction) associated with the portion of the content item packaged by the computing device may be received (e.g., based on the indicia of the service metric). The disable message may be received from the video quality agent. The video quality agent may be part of the first network or part of a second network (e.g., a datacenter, central location, etc.). The video quality agent may send the disable message based on a determination that the portion of the content item packaged by the computing device does not satisfy a quality threshold (e.g., based on the indicia of the service metric). The video quality agent may send the disable message based on a determination that the indicia of the service metric is associated with a lower quality of packaged content as compared to a portion of the content item packaged by another computing device (e.g., a packaging device such as combiner 117 of FIG. 1 or any of the packaging devices shown in FIGS. 2, 4, 5, and 6, and the like).

At step 1050, delivery of the portion of the content item packaged by the computing device may be disabled (e.g., caused to be disabled based on the disable message/instruction received from the video quality agent). The computing device may receive a second portion of the content item. The second portion of the content item may be received by the computing device from the first source. The computing device may package the second portion of the content item for delivery to a requesting device. The computing device may receive an instruction (e.g., from the video quality agent) to deliver the second portion of the content item to a second requesting device. The second requesting device may be a set-top box, a digital streaming device, a gaming device, a media storage device, a digital recording device, a computing device, a mobile computing device (e.g., a laptop, a smartphone, a tablet, etc.), a combination thereof, and/or the like. The instruction may be received based on a request (e.g., via a HTTP 1.1 GET request) sent by the second requesting device. The request sent by the second requesting device may indicate that the second portion of the content item is to be received from (e.g., originate from) a second source. The second source may be a content source such as any of input sources 102a, 102b, or 102c; content source 202, content source 302, content source 304, content source 702, content source 802, and the like. Based on the instruction sent by the second requesting device, the computing device may send the packaged second portion of the content item received by the computing device from the first source to the second requesting device. (e.g., despite the request from the second requesting device indicating that the second portion of the content item was to be delivered by the second content source).

Figure 11:
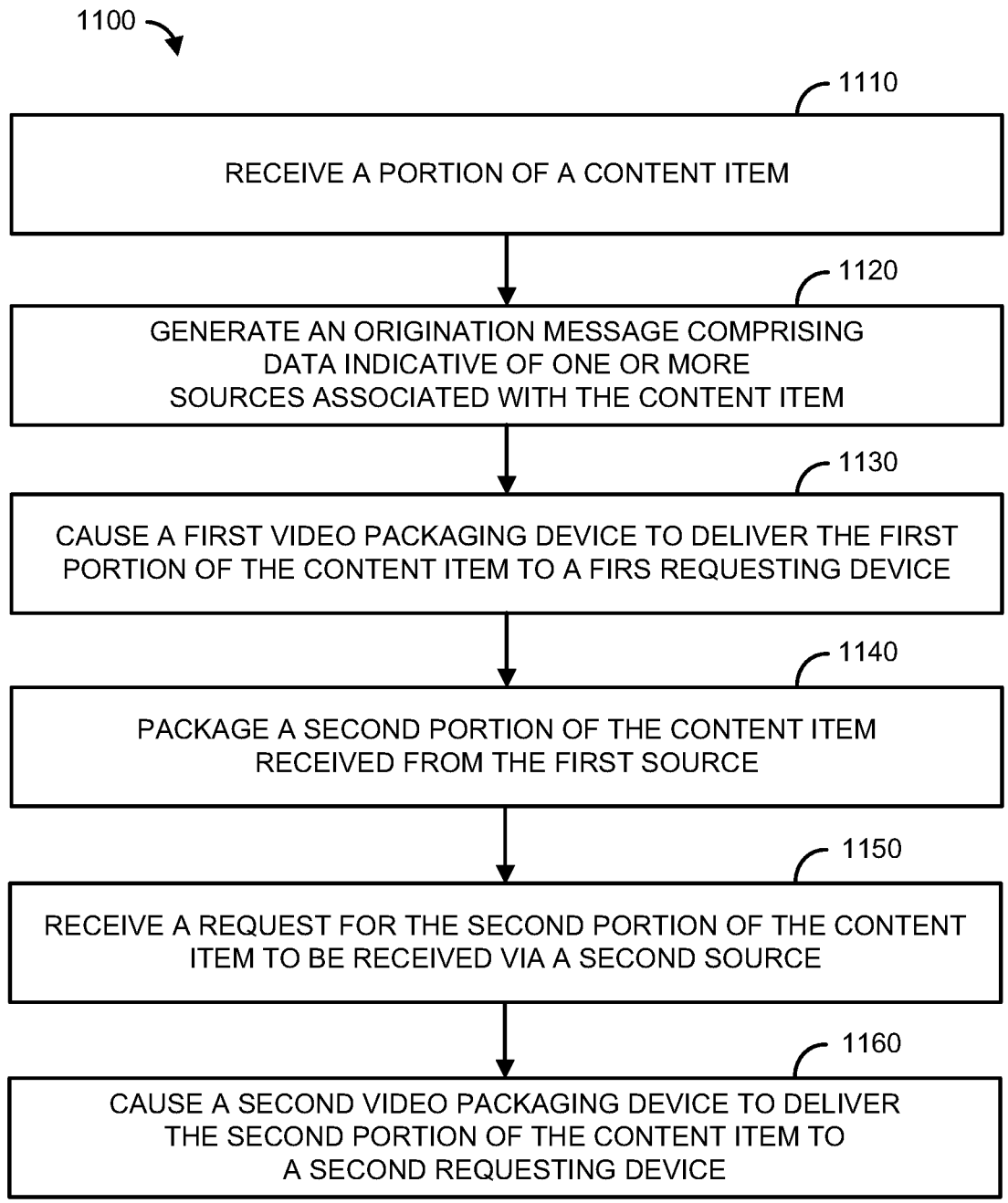
FIG. 11 shows a flowchart of a method for delivering content.

FIG. 11 is a flowchart of a method 1100 for distributing content in accordance with the present description. Method 1100 may be implemented using the system 100 of FIG. 1, the system 200 of FIG. 2, the system 300 of FIG. 3, the communication flows of FIGS. 4 and 6; the system 600 of FIG. 6; the system 700 of FIG. 7 and/or the system 800 or the system 850 of FIG. 8. At step 1110, a portion of a content item to be delivered to a first requesting device may be received. The portion of the content item may be a number of frames of video content, a duration of audio content, a number of data packets of video content and/or audio content, and the like. The first requesting device may be a set-top box, a digital streaming device, a gaming device, a media storage device, a digital recording device, a computing device, a mobile computing device (e.g., a laptop, a smartphone, a tablet, etc.), a combination thereof, and/or the like. The portion of the content item may be received from a first source, such as any of input sources 102a, 102b, or 102c; content source 202, content source 302, content source 304, content source 702, content source 802, and the like. The portion of the content item may be received at a first packaging device and at a second packaging device. Each of the first packaging device and the second packaging device may be a combiner, such as combiner 117 of FIG. 1, and/or a packaging device, such as any of the packaging devices shown in FIGS. 2, 4, 5, and 6, and the like. The first packaging device may be part of a first network (e.g., a datacenter, central location, etc.) and the second packaging device may be part of a second network (e.g., a datacenter, central location, etc.). At step 1120, an origination message (e.g., a HTTP 1.1 200 OK message and/or an origination header) indicating one or more sources associated with the content item may be generated.

At step 1130, the first packaging device may deliver a first portion of the content item packaged by the first packaging device to the requesting device. The first packaging device may deliver the packaged first portion of the content item based on a determination that the packaged first portion of the content item satisfies a quality threshold. The determination may be based on a first service metric and a second service metric. The first service metric may be received by a first computing device (e.g., a video quality agent associated with the first packaging device). The first computing device may be part of the first network, the second network, or a third network. The second service metric may be received by a second computing device (e.g., a video quality agent associated with the first packaging device). The second computing device may be part of the first network, the second network, or a third network. The first service metric may be associated with the first portion of the content item packaged by the first packaging device. The second service metric may be associated with the first portion of the content item packaged by the second packaging device. The first service metric and the second service metric may each be based on one or more packaging errors (e.g., a loss of a packet identifier, an encoder boundary point misalignment, or a loss of an audio packet identifier associated with the first portion of the content item, a change in metadata associated with the content item, or any other aspect of packaging the content item that may be observable by the first packaging device).

At step 1140, the first packaging device and the second packaging device may each package a second portion of the content item. The second portion of the content item may be received by each of the first packaging device and the second packaging from the first source. At step 1150, a request for the second portion of the content item may be received from a second requesting device. The second requesting device may be a set-top box, a digital streaming device, a gaming device, a media storage device, a digital recording device, a computing device, a mobile computing device (e.g., a laptop, a smartphone, a tablet, etc.), a combination thereof, and/or the like. The request for the second portion of the content item may indicate that the second requesting device is to receive the second portion of the content item from a packaging device that received the second portion of the content item from a second source, such as any of input sources 102a, 102b, or 102c; content source 202, content source 302, content source 304, content source 702, content source 802, and the like. At step 1160, the second packaging device may deliver the second portion of the content item to the second requesting device. The second packaging device may be caused to deliver the second portion of the content item to the second requesting device based on a determination that the second portion of the content item packaged by the second packaging device satisfies the quality threshold. The second packaging device may be caused to deliver the second portion of the content item to the second requesting device based on a determination that the second portion of the content item packaged by the second packaging device satisfies the quality threshold to a greater degree than the second portion of the content item packaged by the first packaging device (e.g., the second portion packaged by the second packaging device is determined to be of a higher quality as compared to the second portion packaged by the first packaging device).

Figure 12:
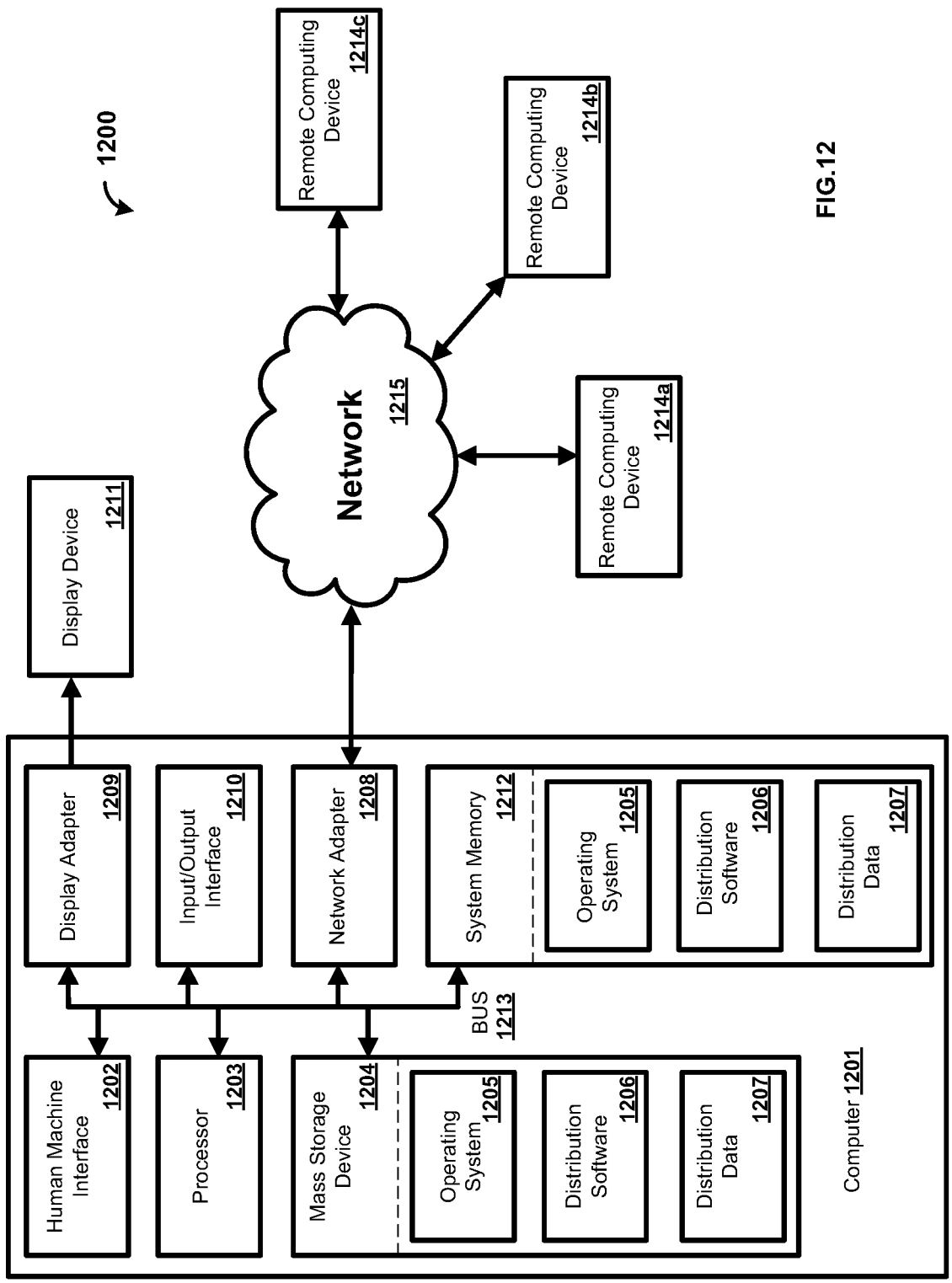
FIG. 12 shows a block diagram of a computing device for delivering content.

FIG. 12 shows a system 1200 for distributing content in accordance with the present description. The central location 101, the server 110, the mobile device 126, the application server 126, the content source 127, and/or the edge device 128 of FIG. 1 may each be a computer 1201 as shown in FIG. 12. Each of the devices/entities shown in FIGS. 2-5 may be a computer 1201 as shown in FIG. 12. The computer 1201 may comprise one or more processors 1203, a system memory 1212, and a bus 1213 that couples various system components including the one or more processors 1203 to the system memory 1212. In the case of multiple processors 1203, the computer 1201 may utilize parallel computing. The bus 1213 is one or more of several possible types of bus structures, including a memory bus or memory controller, a peripheral bus, an accelerated graphics port, or local bus using any of a variety of bus architectures.

The computer 1201 may operate on and/or comprise a variety of computer readable media (e.g., non-transitory media). The readable media may be any available media that is accessible by the computer 1201 and may include both volatile and non-volatile media, removable and non-removable media. The system memory 1212 has computer readable media in the form of volatile memory, such as random access memory (RAM), and/or non-volatile memory, such as read only memory (ROM). The system memory 1212 may store data such as the distribution data 1207 and/or program modules such as the operating system 1205 and the distribution software 1206 that are accessible to and/or are operated on by the one or more processors 1203.

The computer 1201 may also have other removable/non-removable, volatile/non-volatile computer storage media. FIG. 12 shows the mass storage device 1204 which may provide non-volatile storage of computer code, computer readable instructions, data structures, program modules, and other data for the computer 1201. The mass storage device 1204 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 1204, such as the operating system 1205 and the distribution software 1206. Each of the operating system 1205 and the distribution software 1206 (e.g., or some combination thereof) may have elements of the program modules and the distribution software 1206. The distribution data 1207 may also be stored on the mass storage device 1204. The distribution data 1207 may be stored in any of one or more databases known in the art. Such databases may be DB2®, Microsoft® Access, Microsoft® SQL Server, Oracle®, mySQL, PostgreSQL, and the like. The databases may be centralized or distributed across locations within the network 1215.

A user may enter commands and information into the computer 1201 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 1203 via a human machine interface 1202 that is coupled to the bus 1213, but may be connected by other interface and bus structures, such as a parallel port, game port, an IEEE 1394 Port (also known as a Firewire port), a serial port, network adapter 1208, and/or a universal serial bus (USB).

The display device 1211 may also be connected to the bus 1213 via an interface, such as the display adapter 1209. It is contemplated that the computer 1201 may have more than one display adapter 1209 and the computer 1201 may have more than one display device 1211. The display device 1211 may be a monitor, an LCD (Liquid Crystal Display), light emitting diode (LED) display, television, smart lens, smart glass, and/or a projector. In addition to the display device 1211, other output peripheral devices may be components such as speakers (not shown) and a printer (not shown) which may be connected to the computer 1201 via the Input/Output Interface 1210. Any step and/or result of the methods may be output (or caused to be output) in any form to an output device. Such output may be any form of visual representation, including, but not limited to, textual, graphical, animation, audio, tactile, and the like. The display device 1211 and computer 1201 may be part of one device, or separate devices.

The computer 1201 may operate in a networked environment using logical connections to one or more remote computing devices 1214*a,b,c*. A remote computing device may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device, and so on. Logical connections between the computer 1201 and a remote computing device 1214*a,b,c* may be made via a network 1215, such as a local area network (LAN) and/or a general wide area network (WAN). Such network connections may be through the network adapter 1208. The network adapter 1208 may be implemented in both wired and wireless environments. Such networking environments are conventional and commonplace in dwellings, offices, enterprise-wide computer networks, intranets, and the Internet.

Application programs and other executable program components such as the operating system 1205 are shown herein as discrete blocks, although it is recognized that such programs and components reside at various times in different storage components of the computing device 1201, and are executed by the one or more processors 1203 of the computer. An implementation of the distribution software 1206 may be stored on or sent across some form of computer readable media. Any of the described methods may be performed by processor-executable instructions embodied on computer readable media.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. One or more non-transitory computer-readable media storing processor-executable instructions that, when executed by at least one processor, cause the at least one processor to:
   receive, by a first video packaging device and by a second video packaging device, a first portion of a content item;
   package, by the first video packaging device and the second video packaging device, the first portion of the content item;
   determine, based on a first service metric associated with the first video packaging device, that the first portion of the content item packaged by the first video packaging device meets or exceeds a quality threshold;
   cause, based on the first portion of the content item packaged by the first video packaging device meeting or exceeding the quality threshold, the first video packaging device to deliver the first portion of the content item packaged by the first video packaging device to a first requesting device; and
   send, to the second video packaging device, instructions to disable delivery of the first portion of the content item, packaged by the second video packaging device, to the first requesting device.

2. The non-transitory computer-readable media of claim 1, wherein the first service metric is based on one or more packaging errors.

3. The non-transitory computer-readable media of claim 1, wherein the first video packaging device is part of a first network and the second video packaging device is part of a second network.

4. The non-transitory computer-readable media of claim 3, wherein the processor-executable instructions, when executed by the at least one processor, further cause the at least one processor to:
   receive, by a computing device, the first service metric from a first video quality component associated with the first network; and
   receive, by the computing device, a second service metric from a second video quality component associated with the second network, wherein the second service metric is based on one or more packaging errors.

5. The non-transitory computer-readable media of claim 4, wherein the computing device is part of the first network or the second network.

6. The non-transitory computer-readable media of claim 1, wherein the first portion of the content item received by the first video packaging device and the second video packaging device originates from a first source.

7. The non-transitory computer-readable media of claim 6, wherein the processor-executable instructions, when executed by the at least one processor, further cause the at least one processor to:
   receive, by the second video packaging device and from the first source, a second portion of the content item, wherein the second portion of the content item is packaged by the second video packaging device;
receive, from a second requesting device, a request for the second portion of the content item to be delivered from a second source; and
cause, based on the second portion of the content item, packaged by the second video packaging device, meeting or exceeding the quality threshold, the second video packaging device to deliver the second portion of the content item to the second requesting device.

8. A system comprising:
a first requesting device configured to send a request for a content item;
a first video packaging device configured to:
receive a first portion of the content item; and
package the first portion of the content item;
a second video packaging device configured to:
receive the first portion of the content item;
package the first portion of the content item;
determine, based on a first service metric associated with the second video packaging device, the first portion of the content item packaged by the second video packaging device meets or exceeds a quality threshold;
deliver, based on the first portion of the content item packaged by the second video packaging device meeting or exceeding the quality threshold, the first portion of the content item packaged by the second video packaging device to the first requesting device; and
send, to the first video packaging device, instructions to disable delivery of the first portion of the content item, packaged by the first video packaging device, to the first requesting device.

9. The system of claim 8, wherein the first service metric is based on one or more packaging errors.

10. The system of claim 8, wherein the first video packaging device is part of a first network and the second video packaging device is part of a second network.

11. The system of claim 10, wherein the system further comprises:
a computing device configured to:
receive the first service metric from a first video quality component associated with the first network, wherein the first service metric is based on one or more packaging errors; and
receive a second service metric from a second video quality component associated with the second network.

12. The system of claim 11, wherein the computing device is part of the first network or the second network.

13. The system of claim 8, wherein the first portion of the content item received by the first video packaging device and the second video packaging device originates from a first source.

14. The system of claim 13, wherein the system further comprises:
a second requesting device configured to send a request for a second portion of the content item to be delivered from a second source;
wherein the first video packaging device is further configured to:
receive, from the first source, the second portion of the content item, wherein the second portion of the content item is packaged by the second video packaging device;
receive, from the second requesting device, the request for the second portion of the content item; and
cause, based on the second portion of the content item, packaged by the second video packaging device, meeting or exceeding the quality threshold, the second video packaging device to deliver the second portion of the content item to the second requesting device.

15. One or more non-transitory computer-readable media storing processor-executable instructions that, when executed by at least one processor, cause the at least one processor to:
receive, by a first video packaging device and by a second video packaging device, a first portion of a content item;
package, by the first video packaging device and the second video packaging device, the first portion of the content item;
determine, based on service metric data associated with the first video packaging device, that the first portion of the content item, packaged by the first video packaging device, does not meet or exceed a quality threshold; and
receive, by the first video packaging device, instructions to disable delivery of the first portion of the content item packaged by the first video packaging device.

16. The non-transitory computer-readable media of claim 15, wherein the service metric data is indicative of one or more packaging errors.

17. The non-transitory computer-readable media of claim 15, wherein the processor-executable instructions, when executed by the at least one processor, further cause the at least one processor to receive the instructions from a video quality component.

18. The non-transitory computer-readable media of claim 15, wherein the first video packaging device is part of a first network and the second video packaging device is part of a second network.

19. The non-transitory computer-readable media of claim 15, wherein the first portion of the content item, received by the first video packaging device, originates from a first source, wherein the processor-executable instructions, when executed by the at least one processor, further cause the at least one processor to:
receive, by the first video packaging device and from the first source, a second portion of the content item; and
package, by the first video packaging device, the second portion of the content item.

20. The non-transitory computer-readable media of claim 19, wherein the processor-executable instructions, when executed by the at least one processor, further cause the at least one processor to: receive, by the first video packaging device, an instruction to deliver the packaged second portion of the content item to a requesting device, wherein the processor-executable instructions, when executed by the at least one processor, further cause the at least one processor to receive the instruction based on a request, sent by the requesting device, for the second portion of the content item to be delivered from a second source.

21. The non-transitory computer-readable media of claim 20, wherein the processor-executable instructions, when executed by the at least one processor, further cause the at least one processor to: send, based on the instruction, the packaged second portion of the content item to the requesting device.

22. A system comprising:
a first video packaging device configured to:
receive a first portion of a content item;
package the first portion of the content item;
determine, based on service metric data associated with the first video packaging device, the first portion of the content item, packaged by the first video packaging device, does not meet or exceed a quality threshold; and
receive instructions to disable delivery of the first portion of the content item packaged by the first video packaging device; and
a second video packaging device configured to:
receive the first portion of the content item; and
package the first portion of the content item.

23. The system of claim 22, wherein the service metric data is indicative of one or more packaging errors.

24. The system of claim 22, wherein the first video packaging device is further configured to receive the instructions from a video quality component.

25. The system of claim 22, wherein the first video packaging device is part of a first network and the second video packaging device is part of a second network.

26. The system of claim 22, wherein the first portion of the content item, received by the first video packaging device, originates from a first source, wherein the first video packaging device is further configured to:
receive, from the first source, a second portion of the content item; and
package the second portion of the content item.

27. The system of claim 26, wherein the system further comprises:
a requesting device configured to send a request for the second portion of the content item to be delivered from a second source; and
wherein the first video packaging device is further configured to receive an instruction, based on the request for the second portion of the content item from the second source, to deliver the packaged second portion of the content item to the requesting device.

28. The system of claim 27, wherein the first video packaging device is further configured to send, based on the instruction, the packaged second portion of the content item to the requesting device.

29. One or more non-transitory computer-readable media storing processor-executable instructions that, when executed by at least one processor, cause the at least one processor to:
receive, by a first video packaging device and by a second video packaging device, a first portion of a content item;
package, by the first video packaging device and the second video packaging device, the first portion of the content item;
determine, based on a first service metric associated with the first video packaging device, that the first portion of the content item, packaged by the first video packaging device meets or exceeds a quality threshold; and
send, to the second video packaging device, instructions to disable delivery of the first portion of the content item packaged by the second video packaging device, wherein the instructions to disable delivery are received prior to delivery of the first portion of the content item by the first video packaging device.

30. The non-transitory computer-readable media of claim 29, wherein the processor-executable instructions that, when executed by the at least one processor, cause the at least one processor to determine the first portion of the content item, packaged by the first video packaging device, meets or exceeds the quality threshold, further cause the at least one processor to:
receive, by a computing device, the first service metric associated with the first portion of the content item packaged by the first video packaging device; and
receive, by the computing device, a second service metric associated with the first portion of the content item packaged by the second video packaging device.

31. The non-transitory computer-readable media of claim 30, wherein the processor-executable instructions that, when executed by the at least one processor, cause the at least one processor to receive the first service metric and the second service metric, further cause the at least one processor to:
receive, by the computing device, the first service metric from a first video quality component associated with a first network; and
receive, by the computing device, the second service metric from a second video quality component associated with a second network.

32. The non-transitory computer-readable media of claim 31, wherein the first video packaging device is part of the first network and the second video packaging device is part of the second network.

33. The non-transitory computer-readable media of claim 31, wherein the computing device is part of the first network or the second network.

34. The non-transitory computer-readable media of claim 30, wherein the first service metric and the second service metric are each indicative of one or more packaging errors.

35. A system comprising:
a first video packaging device configured to:
receive a first portion of a content item; and
package the first portion of the content item; and
a second video packaging device configured to:
receive the first portion of the content item;
package the first portion of the content item;
determine, based on a first service metric associated with the second video packaging device, the first portion of the content item, packaged by the second video packaging device meets or exceeds a quality threshold; and
send, to the first video packaging device, instructions to disable delivery of the first portion of the content item packaged by the first video packaging device, wherein the instructions to disable delivery are received prior to delivery of the first portion of the content item by the second video packaging device.

36. The system of claim 35, wherein the system further comprises:
a computing device configured to:
receive the first service metric associated with the first portion of the content item packaged by the first video packaging device; and
receive a second service metric associated with the first portion of the content item packaged by the second video packaging device.

37. The system of claim 36, wherein the computing device is further configured to:
receive the first service metric from a first video quality component associated with a first network; and
receive the second service metric from a second video quality component associated with a second network.

38. The system of claim 37, wherein the first video packaging device is part of the first network and the second video packaging device is part of the second network.

39. The system of claim 37, wherein the computing device is part of the first network or the second network.

40. The system of claim 36, wherein the first service metric and the second service metric are each indicative of one or more packaging errors.

* * * * *